(12) United States Patent
Park et al.

(10) Patent No.: US 11,487,413 B2
(45) Date of Patent: Nov. 1, 2022

(54) MOBILE DEVICE AND CONTROL METHOD FOR MOBILE DEVICE

(71) Applicant: SAMSUNG ELECTRONICS CO., LTD., Suwon-si (KR)

(72) Inventors: Min Sun Park, Suwon-si (KR); Sung Hyun Jang, Suwon-si (KR); Eun Young Choi, Suwon-si (KR); Ji-Youn Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/284,639

(22) PCT Filed: Feb. 19, 2019

(86) PCT No.: PCT/KR2019/001939
§ 371 (c)(1),
(2) Date: Apr. 12, 2021

(87) PCT Pub. No.: WO2020/075925
PCT Pub. Date: Apr. 16, 2022

(65) Prior Publication Data
US 2021/0397332 A1     Dec. 23, 2021

(30) Foreign Application Priority Data
Oct. 12, 2018 (KR) .......................... 10-2018-0121724

(51) Int. Cl.
*G06F 3/04845* (2022.01)
*G06F 3/04842* (2022.01)
*G06T 11/00* (2006.01)

(52) U.S. Cl.
CPC ...... *G06F 3/04845* (2013.01); *G06F 3/04842* (2013.01); *G06T 11/00* (2013.01)

(58) Field of Classification Search
CPC ............ G06F 3/04845; G06F 3/04842; G06F 1/1686; G06F 3/011; G06F 3/0304;
(Continued)

(56) References Cited

U.S. PATENT DOCUMENTS 7,199,934 B2 * 4/2007 Yamasaki ............... G06F 3/012
359/630
9,201,625 B2 * 12/2015 Karkkainen ......... G02B 27/017
(Continued)

FOREIGN PATENT DOCUMENTS

KR   10-2011-0133295 A   12/2011
KR   10-2012-0076541 A   7/2012
(Continued)

OTHER PUBLICATIONS

Communication dated Oct. 4, 2021 issued by the European Intellectual Property Office in counterpart European Application No. 19871289.5.
(Continued)

*Primary Examiner* — Benyam Ketema
(74) *Attorney, Agent, or Firm* — Sughrue Mion, PLLC

(57) ABSTRACT

For realistic mounting simulation of an image device, a mobile device according to one embodiment comprises: a display; a camera for photographing a space in which the image device is to be mounted; a user interface unit for receiving a user's input; and a control unit for controlling the display so that an image of the space photographed by the camera is displayed together with a grid, and controlling the display so that a virtual image of the image device, of which the size has been adjusted in response to the user's input, is displayed on the grid.

12 Claims, 22 Drawing Sheets

(58) Field of Classification Search
CPC ...... G06F 3/04815; G06F 3/005; G06T 11/00; H04N 5/232939
See application file for complete search history.

(56) References Cited

U.S. PATENT DOCUMENTS

| | | | | |
|---|---|---|---|---|
| 9,330,478 | B2* | 5/2016 | Anderson | G06F 3/04815 |
| 9,335,547 | B2* | 5/2016 | Takano | G06F 3/04812 |
| 9,361,732 | B2* | 6/2016 | Ebstyne | G02B 27/017 |
| 9,530,232 | B2* | 12/2016 | Maciocci | G06T 11/60 |
| 9,927,877 | B2* | 3/2018 | Cox | G06F 3/0488 |
| 10,262,226 | B1* | 4/2019 | Flowers | G06V 10/32 |
| 10,281,976 | B2* | 5/2019 | Nishizawa | H04B 5/0031 |
| 10,692,287 | B2* | 6/2020 | Evans | G06T 19/006 |
| 11,145,096 | B2* | 10/2021 | McHugh | G06F 3/013 |
| 11,258,891 | B2* | 2/2022 | Hoellwarth | G02B 27/022 |
| 2005/0068290 | A1* | 3/2005 | Jaeger | G06F 3/04845 |
| | | | | 345/156 |
| 2011/0157400 | A1* | 6/2011 | Kim | H04N 5/23216 |
| | | | | 348/222.1 |
| 2011/0273369 | A1* | 11/2011 | Imai | G06T 15/50 |
| | | | | 345/158 |
| 2012/0206334 | A1* | 8/2012 | Osterhout | G06F 1/163 |
| | | | | 345/156 |
| 2012/0302289 | A1* | 11/2012 | Kang | G06F 3/016 |
| | | | | 455/557 |
| 2013/0050258 | A1* | 2/2013 | Liu | G06F 3/013 |
| | | | | 345/633 |
| 2013/0325317 | A1* | 12/2013 | Pylappan | G01C 21/3667 |
| | | | | 701/409 |
| 2014/0037189 | A1* | 2/2014 | Ziegler | G06F 9/4401 |
| | | | | 382/154 |
| 2014/0063060 | A1* | 3/2014 | Maciocci | G06F 3/011 |
| | | | | 345/633 |
| 2014/0300733 | A1* | 10/2014 | Mitchell | G06V 20/20 |
| | | | | 348/135 |
| 2016/0073080 | A1* | 3/2016 | Wagner | G06T 5/006 |
| | | | | 348/47 |
| 2016/0267712 | A1* | 9/2016 | Nartker | G06T 19/006 |
| 2016/0291699 | A1* | 10/2016 | Katz | G06F 3/011 |
| 2016/0364907 | A1* | 12/2016 | Schoenberg | G02B 27/017 |
| 2017/0031357 | A1* | 2/2017 | Bear | H04N 21/42202 |
| 2017/0090269 | A1 | 3/2017 | Huang et al. | |
| 2017/0161928 | A1 | 6/2017 | Huang | |
| 2017/0256096 | A1* | 9/2017 | Faaborg | G06T 19/003 |
| 2017/0323488 | A1 | 11/2017 | Mott et al. | |
| 2018/0004401 | A1* | 1/2018 | Travis | G06F 3/04883 |
| 2018/0300952 | A1* | 10/2018 | Evans | G06F 9/453 |
| 2019/0018479 | A1* | 1/2019 | Minami | G06F 3/013 |
| 2019/0065027 | A1* | 2/2019 | Hauenstein | G06F 3/0484 |
| 2020/0051337 | A1* | 2/2020 | Reynolds | H04N 13/128 |
| 2021/0038975 | A1* | 2/2021 | Grillet | G06F 3/04815 |

FOREIGN PATENT DOCUMENTS

| | | |
|---|---|---|
| KR | 10-2016-0036915 A | 4/2016 |
| KR | 10-2016-0086717 A | 7/2016 |
| KR | 10-1636027 B1 | 7/2016 |
| KR | 10-1651620 B1 | 8/2016 |
| KR | 10-2017-0010985 A | 2/2017 |
| KR | 10-2017-0092632 A | 8/2017 |
| KR | 10-2018-0058048 A | 5/2018 |

OTHER PUBLICATIONS

International Search Report dated Jul. 12, 2019 issued by the International Searching Authority in counterpart International Application No. PCT/KR2019/001939 (PCT/ISA/210).

* cited by examiner

FIG.15
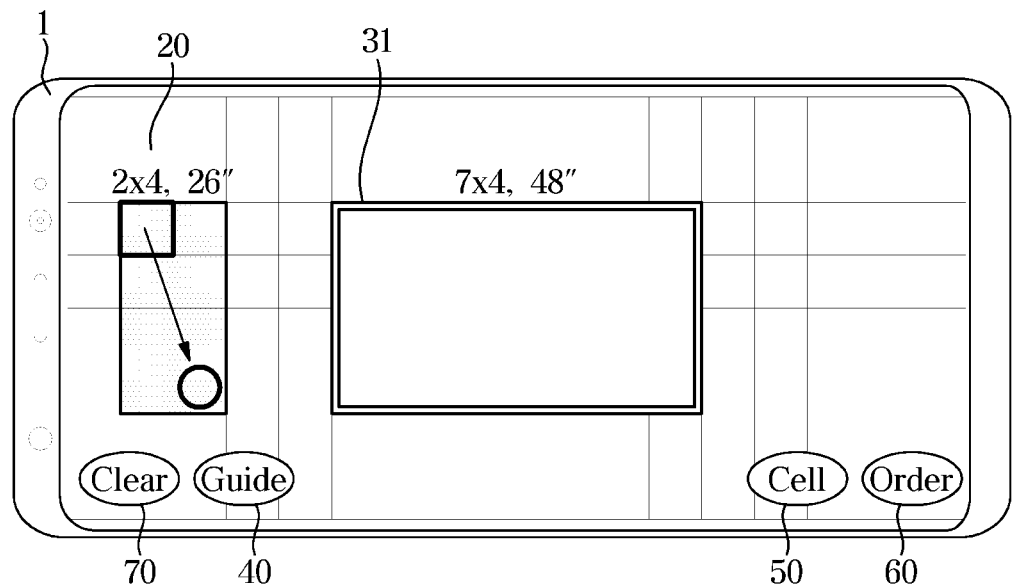
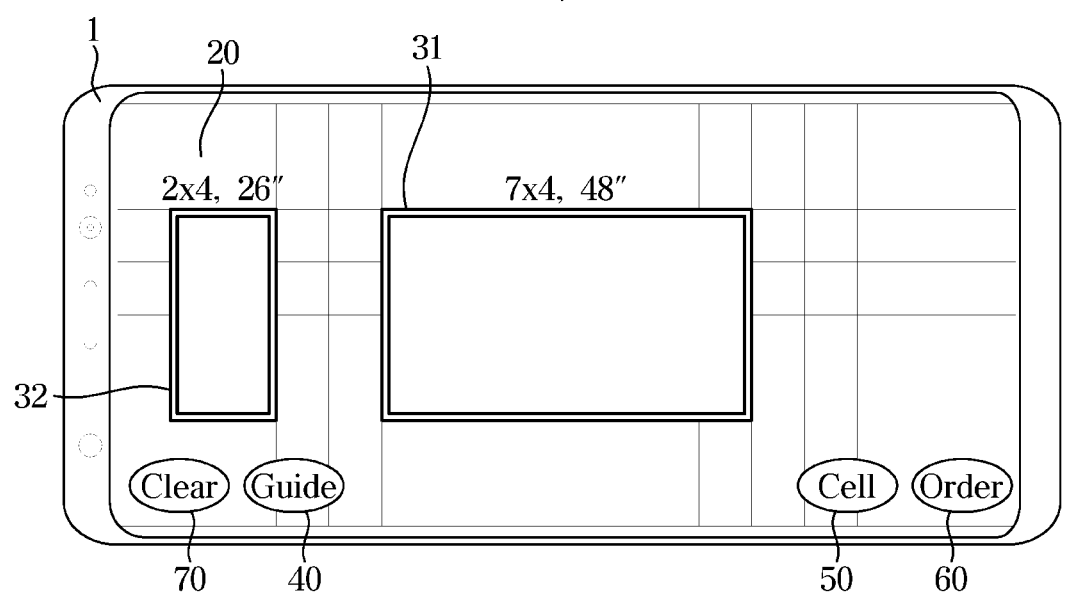

FIG.20
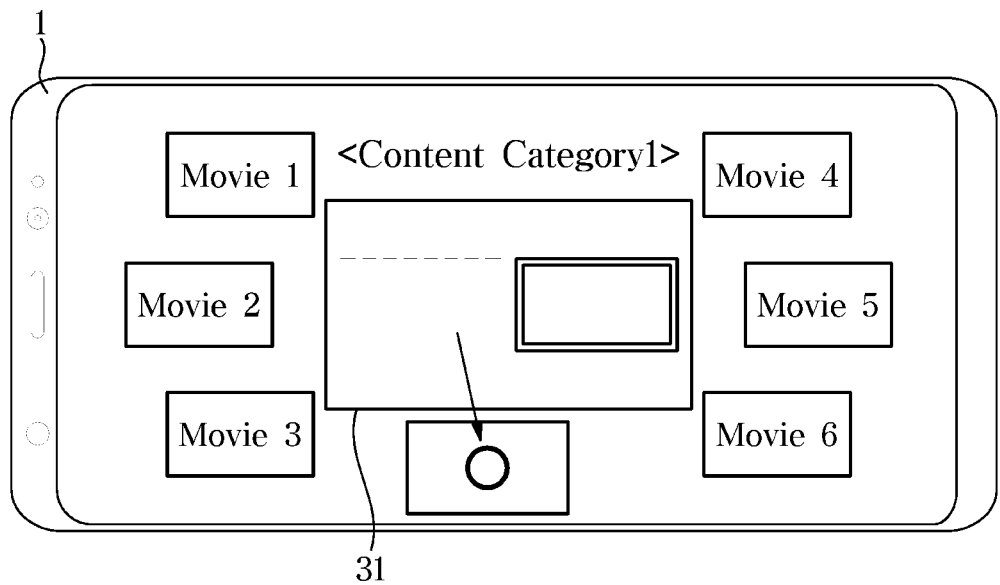
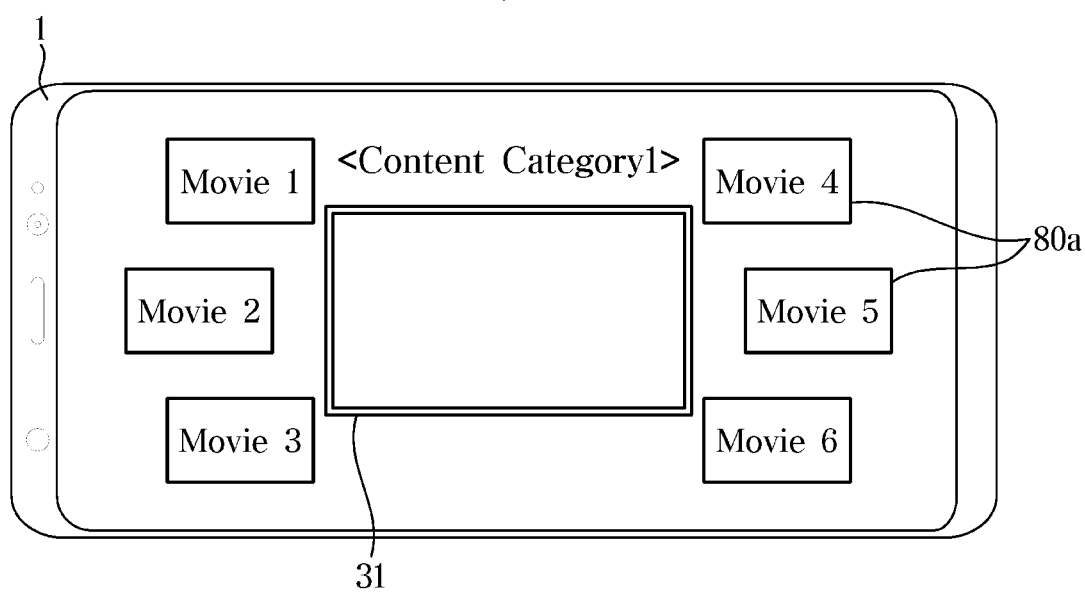

FIG.22
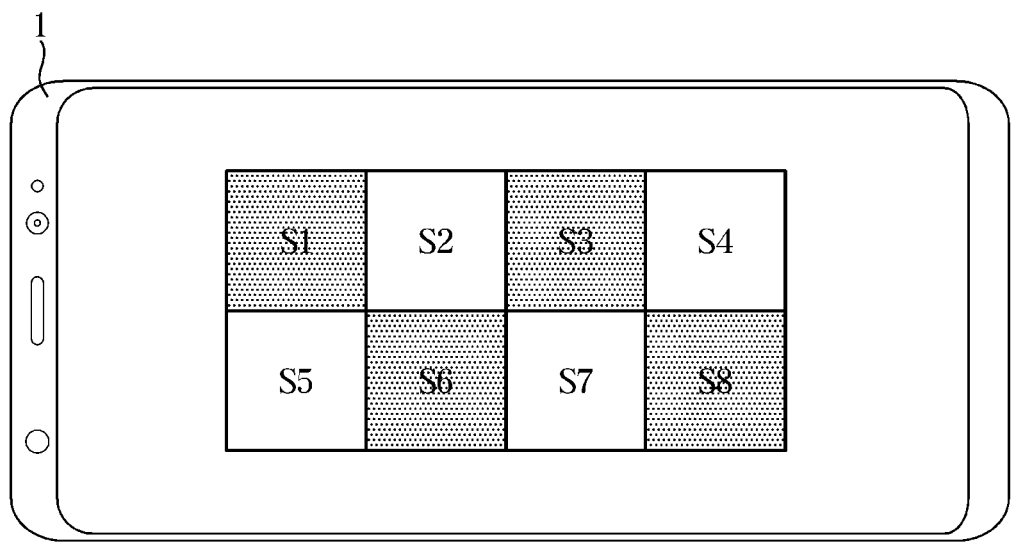
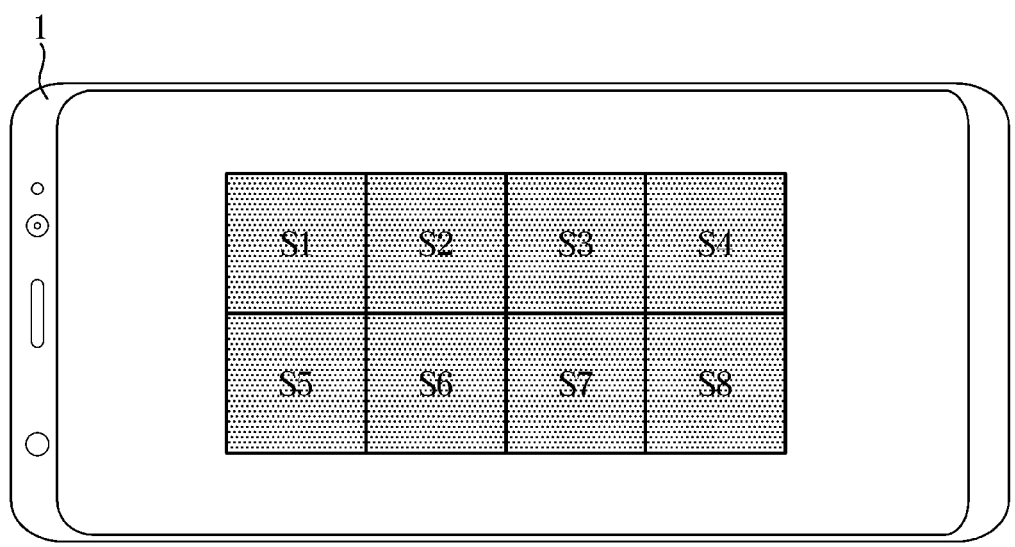

MOBILE DEVICE AND CONTROL METHOD FOR MOBILE DEVICE

TECHNICAL FIELD

The present invention relates to a mobile device capable of simulating the installation of an imaging device using augmented reality technology and a method of controlling the mobile device.

BACKGROUND ART

Mobile devices are devices that provide various functions based on the mobility thereof and are widely used in various fields. Such a mobile device includes various function modules to provide various functions. For example, the mobile device includes a camera module that provides an image capturing function.

There is augmented reality technology as a technology using a camera module of a mobile device. Augmented reality technology refers to graphic technology that combines a virtual object or virtual information with a real environment to make the virtual object or virtual information appear like an object present in the real environment.

Unlike the existing virtual reality technologies implemented using virtual spaces and virtual objects, augmented reality technologies combine virtual objects in real spaces. Therefore, the augmented reality technology has features that can reinforce and provide pieces of additional information that is difficult to acquire only in the real world. Such augmented reality technology can be applied to various real environments and is particularly in the spotlight as next generation display technology suitable for a ubiquitous environment.

Disclosure

Technical Problem

The present invention is directed to providing a mobile device allowing a user to realistically simulate the installation of an imaging device by displaying a virtual image corresponding to the imaging device having an actual size together with an image of a real space in which the imaging device is to be installed, and a method of controlling the mobile device.

The present invention is also directed to providing a mobile device capable of performing calibration on pixel values of a display device including a plurality of display modules using a camera of the mobile device, and a method of controlling the mobile device.

Technical Solution

According to one embodiment of the present invention, a mobile device includes a display, a camera configured to photograph a space in which an imaging device is to be installed, a user interface unit configured to receive a user input, and a control unit configured to control the display to display an image of the space photographed by the camera together with a grid and control the display to display a virtual image of the imaging device having an adjusted size on the grid in response to the user input.

In response to the user input of selecting at least one cell included in the grid, the control unit may control the display to display the virtual image of the imaging device on the selected at least one cell.

In response to the user input of selecting an additional cell from the grid, the control unit may control the display to display the virtual image of the imaging device on the selected additional cell.

The control unit may recognize at least one of a specific pattern and a specific object from the image of the space to recognize a plane on which the imaging device is installable and may control the display to display the grid on the recognized plane.

The control unit may control the display to display the image of the space and a guide line together, may recognize the plane based on the guide line, and may control the display to display the grid on the recognized plane.

In response to the user input of changing a size of a cell of the grid, the control unit may control the display to display the grid having the cell with the changed size together with the image of the space.

In response to the user input of selecting the virtual image of the imaging device, the control unit may control the display to display one or more virtual content images around the virtual image of the imaging device.

In response to the user input of selecting any one virtual content image of the one or more virtual content images, the control unit may control the display to display first content corresponding to the selected virtual content image in an area of the virtual image of the imaging device.

In response to the user input of additionally selecting the virtual content image, the control unit may divide the area of the virtual image of the imaging device into a first area and a second area and may control the display to display the first content and second content corresponding to the additionally selected virtual content image in the first area and the second area, respectively.

The mobile device may further include a communication unit connected to an external server, wherein the control unit acquires purchase information about the imaging device corresponding to the virtual image of the imaging device from the external server and controls the display to display the purchase information about the imaging device together with the virtual image of the imaging device.

According to one embodiment of the present invention, a method of controlling a mobile device includes photographing a space, in which an imaging device is to be installed, using a camera; displaying an image of the space photographed by the camera together with a grid on a display; and in response to a user input, displaying a virtual image of the imaging device, of which a size is adjusted, on the grid.

The displaying of the virtual image of the imaging device on the grid may include, in response to the user input of selecting at least one cell included in the grid, displaying the virtual image of the imaging device on the selected at least one cell.

The displaying of the virtual image of the imaging device on the grid may further include, in response to the user input of selecting an additional cell from the grid, displaying the virtual image of the imaging device on the selected additional cell.

The displaying of the image of the photographed space together with the grid on the display may include recognizing at least one of a specific pattern and a specific object from the image of the space to recognize a plane on which the imaging device is installable and displaying the grid on the recognized plane.

The displaying of the image of the photographed space together with the grid on the display may further include displaying the image of the space and a guide line together on the display, and recognizing the plane based on the guide line and displaying the grid on the recognized plane.

The displaying of the image of the photographed space together with the grid on the display may further include, in response to the user input of changing a size of a cell of the grid, displaying the grid having the cell with the changed size together with the image of the space.

The method may further include, in response to the user input of selecting the virtual image of the imaging device, displaying one or more virtual content images around the virtual image of the imaging device.

The method may further include, in response to the user input of selecting any one virtual content image of the one or more virtual content images, displaying first content corresponding to the selected virtual content image in an area of the virtual image of the imaging device.

The method may further include, in response to the user input of additionally selecting the virtual content image, dividing the image of the virtual image of the imaging device into a first area and a second area and displaying the first content and second content corresponding to the additionally selected virtual content image in the first area and the second area, respectively.

The method may further include acquiring purchase information about the imaging device corresponding to the virtual image of the imaging device from an external server, and displaying the purchase information about the imaging device together with the virtual image of the imaging device.

Advantageous Effects

According to a mobile device and a method of controlling the mobile device according to one aspect, a virtual image corresponding to an imaging device with an actual size is displayed together with an image of a real space in which the imaging device is to be installed, thereby allowing a user to realistically simulate the installation of the imaging device.

In addition, according to a mobile device and a method of controlling the mobile device according to one aspect, content is displayed in an area of a virtual image corresponding to an imaging device with an actual size, thereby performing a more realistic simulation of the installation of the imaging device.

According to a mobile device and a method of controlling the mobile device according to another aspect, calibration can be performed on pixel values of a display device including a plurality of display modules using a camera of the mobile device.

DESCRIPTION OF DRAWINGS

FIGS. 12 to 16 are diagrams for describing the additional display of a virtual image of an imaging device.

FIGS. 19 and 20 are diagrams for describing the display of content by dividing an area of a virtual image of an imaging device.

FIG. 22 is a diagram for describing the calibration of pixel values of a plurality of display modules.

MODES OF THE INVENTION

Figure 1:
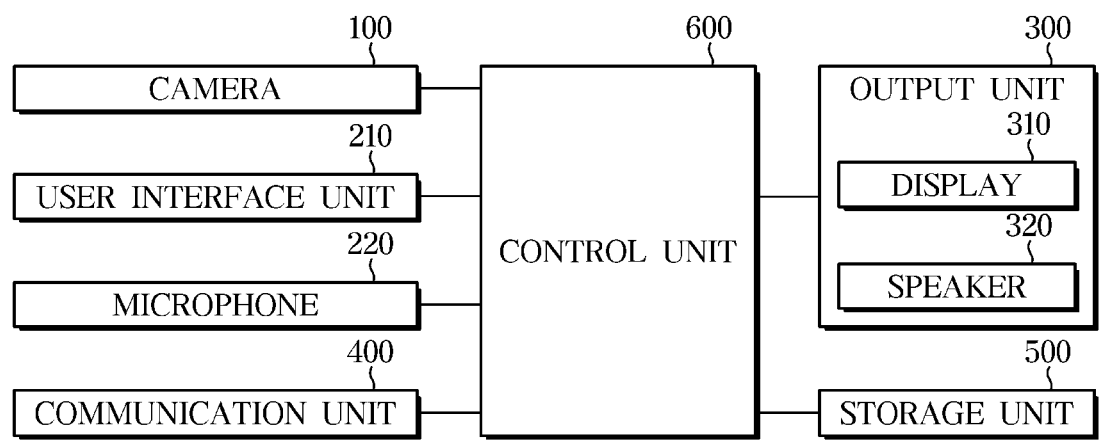
FIG. 1 is a control block diagram of a mobile device according to one embodiment.

Embodiments described herein and configurations shown in the accompanying drawings are only examples of exemplary embodiments of the present invention, and various modifications may be made at the time of filing of the present invention to replace the embodiments and drawings of the present specification. The terms used herein are for the purpose of describing the embodiments and are not intended to restrict and/or to limit the present invention.

The term "unit" used throughout the specification may be implemented in software and/or hardware, and a plurality of "units" may be implemented as one element, or one "unit" may include a plurality of elements. As used herein, the singular forms "a," "an," and "the" are intended to include the plural forms as well, unless the context clearly indicates otherwise. In addition, the term "first" or "second" is used to distinguish one part from another and does not mean a sequential expression unless otherwise specified.

In addition, in this specification, the terms "including," "having," and the like are used to specify features, numbers, steps, operations, elements, components, or combinations thereof but do not preclude the presence or addition of one or more other features, numbers, steps, operations, elements, components, or combinations thereof.

In addition, terms including ordinal numbers such as "first," "second," and the like are used herein to distinguish one element from another element and do not limit one element. In addition, terms such as "unit," "device," "block," "member," "module" etc. used in the present specification may denote a unit for processing at least one function or operation. For example, the terms may denote at least one process executed using at least one piece of hardware, at least one piece of software stored in a memory, or a processor.

Hereinafter, embodiments of the present invention will be described in detail with reference to the accompanying drawings. The same reference numerals or symbols shown in the accompanying drawings may indicate components or elements performing substantially the same function.

Figure 2:
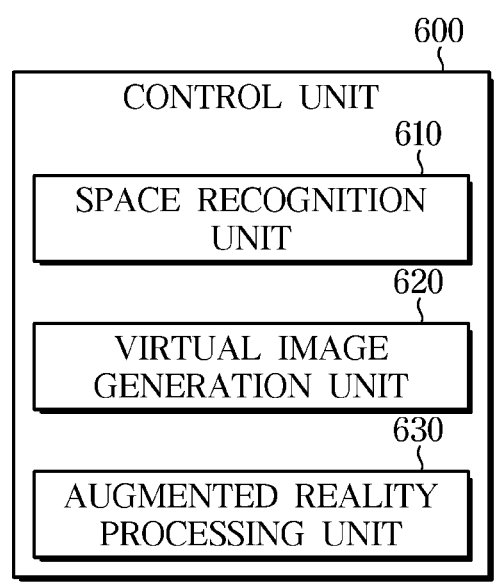
FIG. 2 is a detailed block diagram of a control unit shown in FIG. 1.

FIG. 1 is a control block diagram of a mobile device according to one embodiment, and FIG. 2 is a detailed block diagram of a control unit shown in FIG. 1.

First, a mobile device 1 according to one embodiment includes an device capable of providing augmented reality as a portable device. For example, the mobile device 1 may be implemented as a device, such a mobile phone, a portable multimedia player (PMP), a digital broadcasting player, a personal digital assistant (PDA), a music file player (for example, an MP3 player), a portable game terminal, a tablet personnel computer (PC), or a smartphone, which may be provided with a camera to provide augmented reality. Hereinafter, for convenience of description, it is assumed that the mobile device 1 is a smartphone.

Referring to FIG. 1, the mobile device 1 according to one embodiment may include a camera 100, a user interface (UI)

unit 210, a microphone 220, an output unit 300, a communication unit 400, a storage unit 500, and a control unit 600.

The camera 100 may photograph a space in which an imaging device is to be installed. The camera 100 is a camera module that is typically mounted on the mobile device 1. The camera 100 may include a lens, an image sensor such as a charge coupled device (CCD), a complementary metal-oxide semiconductor (CMOS), and an analog-to-digital converter. The camera 100 converts an image acquired by capturing a subject into a digital signal to transmit the digital signal to the control unit 600. The control unit 600 to be described below may process an image converted into a digital signal.

The UI unit 210 receives and transmits a user input to the control unit 600. The UI unit 210 may include various user input units such as a key pad, a dome switch, a (pressure/capacitive) touch pad, a jog wheel, and a jog switch.

In addition, the UI unit 210 may be a display 310 equipped with a touch panel. The UI unit 210 may be handled the same as the display 310 which senses a user input such as a touch gesture and simultaneously displays a processing result of the user input as an image. The UI unit 210 may display a UI element, through which the mobile device 1 may be controlled, on the display 310.

The microphone 220 may receive and convert an audio signal into an electrical signal to transmit the electrical signal to the control unit 600. The microphone 220 may receive a voice command of a user and transmit the voice command to the control unit 600, and the control unit 600 may control the mobile device 1 in response to the voice command of the user.

The output unit 300 may be a device capable of outputting an image signal or an audio signal and may correspond to various devices. Specifically, the output unit 300 may include at least one of the display 310 and a speaker 320. The speaker 320 may output audio signals related to various functions of the mobile device 1.

The display 310 may display information input by a user or information provided to the user on various screens. The display 310 displays information processed by the control unit 600. For example, the display 310 may display an image of a space photographed by the camera 100 and may display an augmented reality image in which a virtual image is combined with the image of the space. The display 310 may display a graphical UI (GUI) related to various functions of the mobile device 1.

In addition, the display 310 may include a touch panel to be used as an input device. The display 310 may be implemented as a liquid crystal display, a thin film transistor liquid crystal display, an organic light-emitting diode display, a flexible display, or a three dimensional (3D) display.

The communication unit 400 connects the mobile device 1 to an external device, an external server, or the like through a network or a communication channel. The communication unit 400 may include various communication modules. For example, the communication unit 400 may include communication modules connectable to various communication networks such as Bluetooth, ZigBee, a wireless local area network, a home radio frequency (RF), an ultra-wide band (UWB), and the Internet.

Programs and data for controlling the operation of the mobile device 1 may be recorded/stored in the storage unit 500. In addition, the storage unit 500 may store input/output data (for example, messages, still images, and videos).

The storage unit 500 may correspond to a memory and may include volatile memories such as a static random access memory (S-RAM) and a dynamic random access memory (D-RAM) and nonvolatile memories for storing data for a long time, such as a read only memory, an erasable programmable read only memory (EPROM), and an electrically erasable programmable read only memory (EEPROM).

The control unit 600 may include a processor that generates a control signal for controlling the operation of the mobile device 1 according to a program and data stored/recorded in the storage unit 500. The processor may include a logic circuit and an operation circuit and may process data according to a program provided from the storage unit 500 and may generate a control signal according to a processing result.

In addition, the processor and the memory may be implemented as separate chips or as a single chip. The control unit 600 may include a plurality of processors and a plurality of memories.

Referring to FIG. 2, the control unit 600 may include a space recognition unit 610, a virtual image generation unit 620, and an augmented reality processing unit 630. The space recognition unit 610, the virtual image generation unit 620, and the augmented reality processing unit 630 may be implemented as separate processors or may be implemented as one processor.

The space recognition unit 610 may recognize a plane from an image of a space, in which an imaging device photographed by the camera 100 is to be installed, in response to a user input. Specifically, the space recognition unit 610 may distinguish and recognize a wall surface W, a floor surface 10, and a ceiling surface included in an image of a real space. The imaging device may have a planar or curved shape, but for convenience of description, it is assumed that the imaging device has a planar shape. Furthermore, the imaging device may be installed at various positions but is generally installed on a wall surface.

The imaging device is an electronic device capable of displaying an image and refers to a display module. The display module may be a light-emitting diode (LED) module including at least one LED pixel or an LED cabinet in which a plurality of LED modules are connected. A plurality of display modules may be physically connected to form one screen. That is, the imaging device may be a device in which the plurality of display modules are connected and assembled.

In addition, the space recognition unit 610 may store data about a plane recognized from an image of a specific space in the storage unit 500 and may fetch data about a plane from the storage unit 500. When an image of a space photographed by the camera 100 is the same as an image of a space stored in the storage unit 500, the space recognition unit 610 may fetch data about a plane included in the photographed space from the storage unit 500.

As described above, the mobile device 1 according to one exemplary embodiment can automatically recognize a space or a plane in which an imaging device is installable, and thus, it can be easier for a user to simulate the installation of the imaging device.

The virtual image generation unit 620 may generate a virtual image of an object. The generated virtual image of the object may interact with a user input, and a user may select, move, and change the virtual image of the object.

For example, the virtual image generation unit 620 may generate a grid image that is to be displayed on a plane recognized from an image of a space. The grid image is an image of a grid pattern and is an image having a plurality of cells with a certain size. A size of a grid cell may be changed in response to a user input. The virtual image generation unit

620 may generate a grid image having cells with a size changed in response to a user input of changing a size of a grid cell.

In addition, the virtual image generation unit 620 may generate a virtual image of an imaging device and virtual content images that may be displayed around the virtual image of the imaging device. Content is various types of data such as a photo, a video, a sound, and a text, and virtual content images are virtual images including such content information. In addition, content corresponding to a virtual content image may be stored in the storage unit 500 or may be received from the external server or the like through the communication unit 400.

The augmented reality processing unit 630 may display an image of a real space and a virtual image together on the display 310. Specifically, the augmented reality processing unit 630 may generate an augmented reality image obtained by combining an image of a real space and a virtual image and display the generated augmented reality image on the display 310.

The augmented reality processing unit 630 may display a grid image generated by the virtual image generation unit 620 on an image of a space photographed by the camera 100 and may control the display 310 to display a virtual image of an imaging device concurrently on the grid in response to a user input. In addition, the augmented reality processing unit 630 may control the display 310 to display an image of a real space, a virtual image of an imaging device, and a virtual content image together.

As described above, since a virtual image corresponding to an imaging device having an actual size is displayed together with an image of a real space in which the imaging device is to be installed, a user can realistically simulate the installation of the imaging device.

Figure 3:
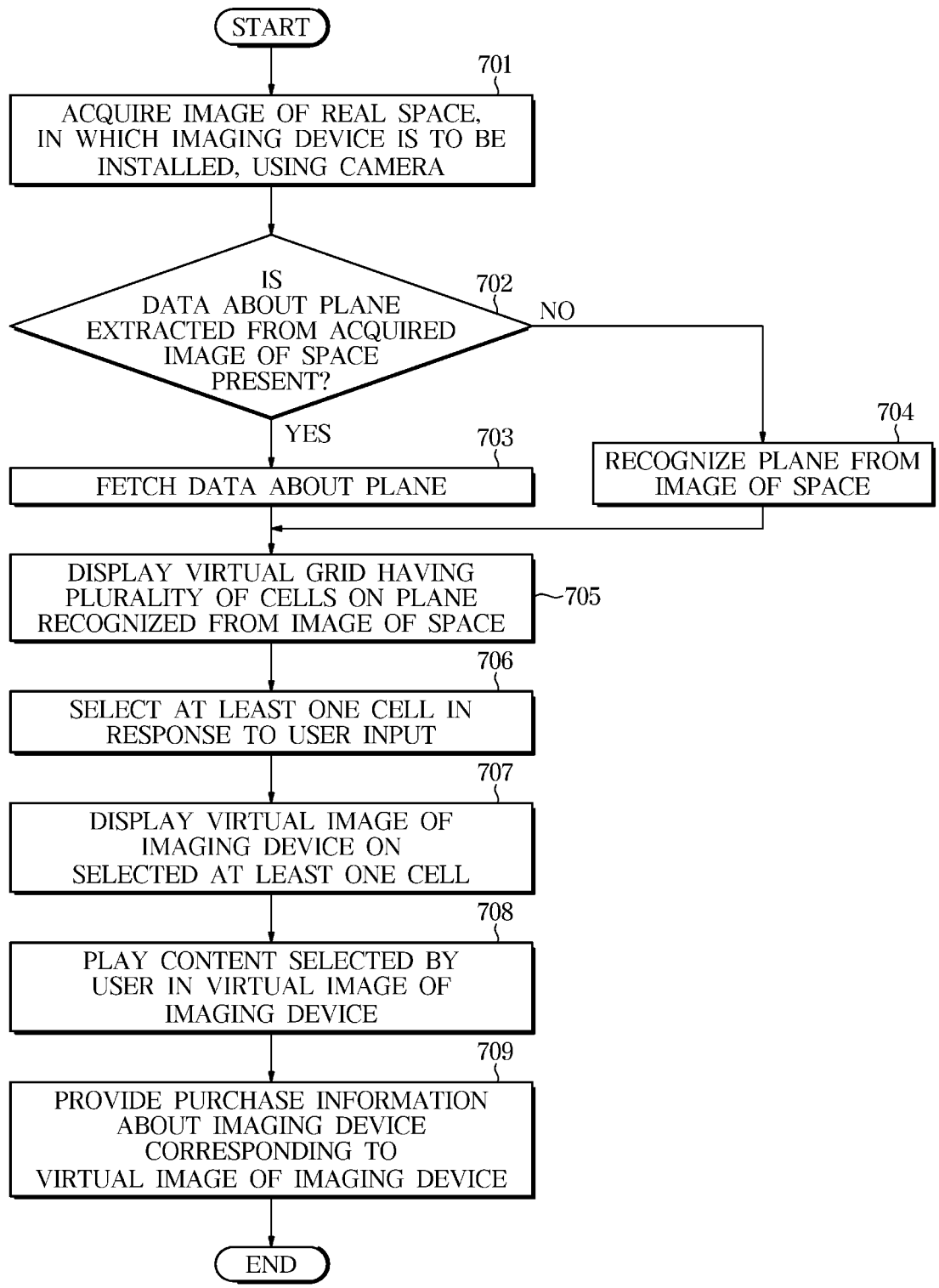
FIG. 3 is a flowchart of a method of controlling a mobile device according to one exemplary embodiment.

FIG. 3 is a flowchart of a method of controlling a mobile device according to one exemplary embodiment. FIG. 3 shows the entire process of simulating the installation of an imaging device.

Referring to FIG. 3, a camera 100 of a mobile device 1 acquires an image by photographing a real space in which an imaging device is to be installed (701). A control unit 600 determines whether data about a plane included in the image of the space photographed by the camera 100 is present in a storage unit 500 (702). When the data about the plane is present in the storage unit 500, the control unit 600 may fetch the data about the corresponding plane. When the data about the plane is not stored in the storage unit 500, the control unit 600 recognizes a plane from the image of the space photographed by the camera 100 (704).

The control unit 600 controls a display 310 to display the image of the photographed space together with a grid. Specifically, the control unit 600 may display a grid including a plurality of cells having a certain size on the plane recognized from the image of the photographed space (705). A UI unit 210 receives an input of selecting at least one cell on the displayed grid from a user (706). In response to a user input of selecting at least one cell, the control unit 600 may generate a virtual image of the imaging device on the selected at least one cell and may control the display 310 to display the generated virtual image of the imaging device together with the image of the photographed space and a grid image (707).

In addition, when a user input of selecting the displayed virtual image of the imaging device is received through the UI unit 210, the control unit 600 may generate one or more virtual content images around the virtual image of the imaging device and may control the display 310 to display the virtual content images. When a user input of selecting any one virtual content image of one or more virtual content images is received, the control unit 600 may control the display 310 to display first content corresponding to the selected virtual content image in an area of the virtual image of the imaging device (708).

As described above, a virtual image corresponding to an imaging device having an actual size is displayed together with an image of a real space in which the imaging device is to be installed, and content is reproduced in an area of the virtual image corresponding to the imaging device having the real size, thereby performing a more realistic simulation of the installation of the imaging device.

In addition, the control unit 600 may acquire purchase information about a real imaging device corresponding to the virtual image of the imaging device from an external server (not shown) and may control the display 310 to display the purchased information about the imaging device together with the virtual image of the imaging device (709).

A user can purchase and install an imaging device that is identical to that simulated by the user so that it is possible to minimize an error that may occur when the imaging device is actually installed.

Hereinafter, the features of the present invention will be described in more detail with reference to FIGS. 4 to 20.

Figure 4:
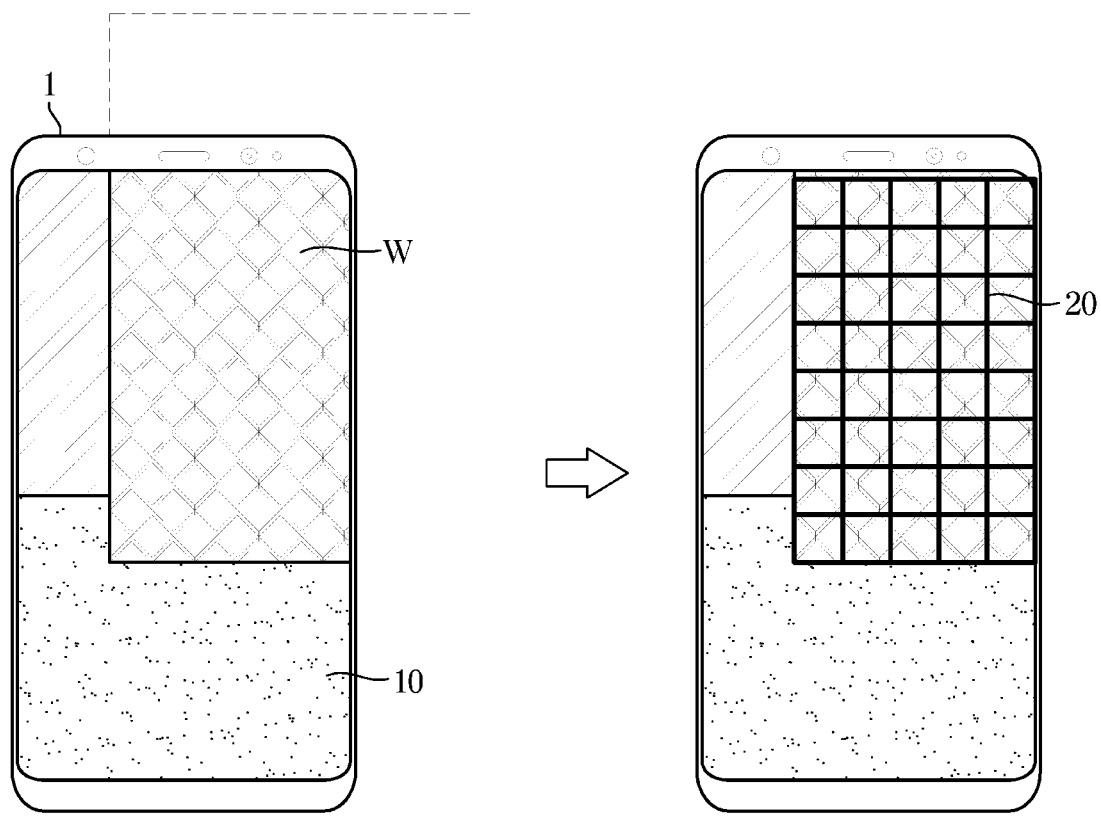
FIGS. 4 to 6 are diagrams for describing various methods of recognizing a plane from an image of a space in which an imaging device is to be installed and displaying a grid.
Figure 5:
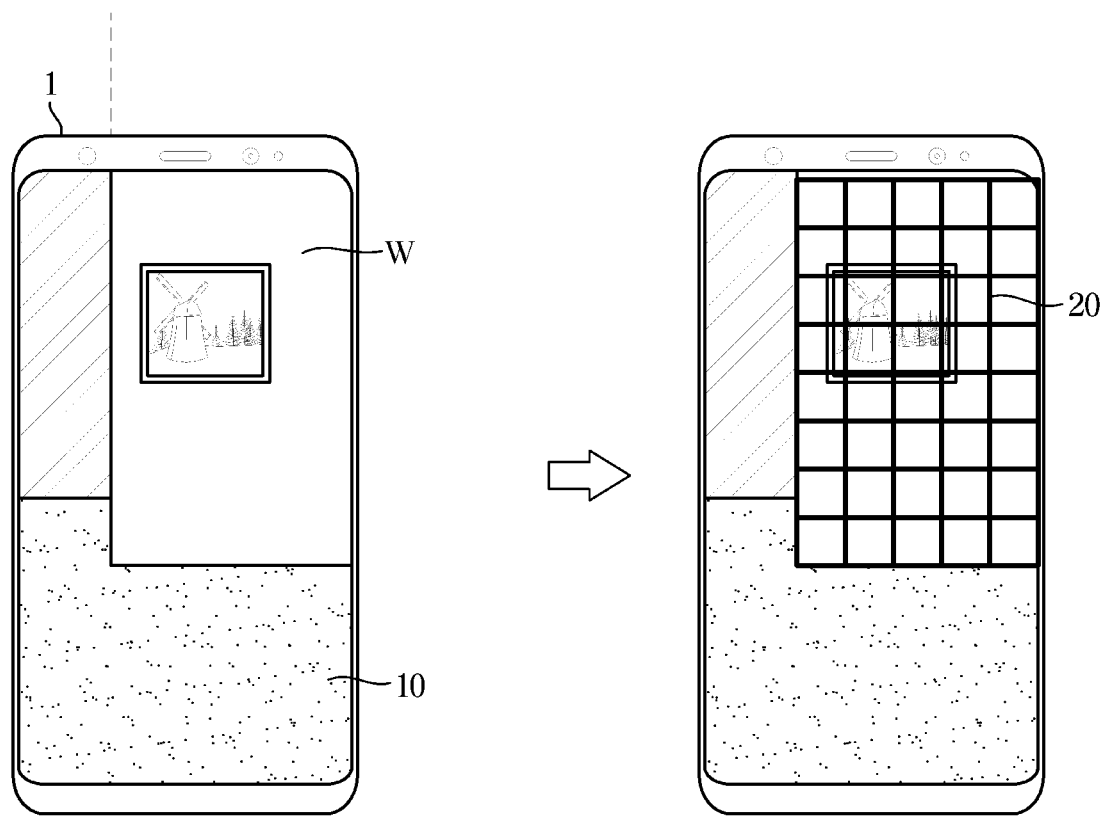
Figure 6:
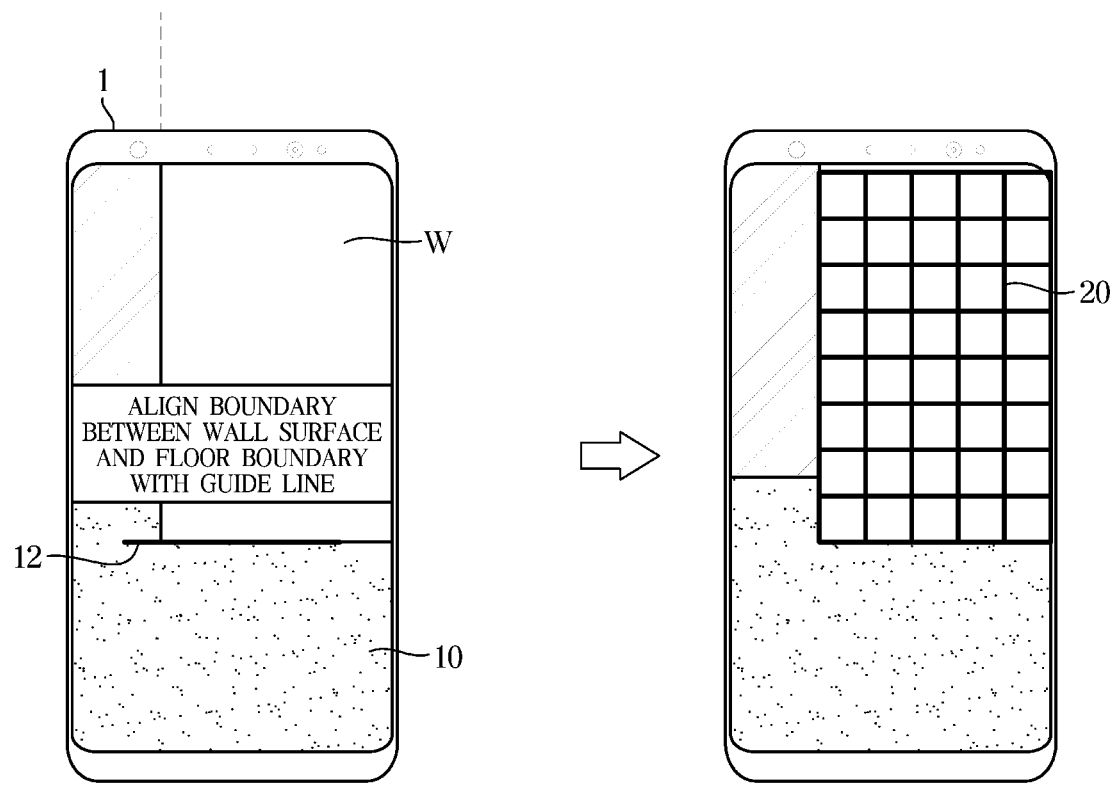

FIGS. 4 to 6 show that a plane is recognized from an image of a space in which an imaging device is to be installed and a grid is displayed through various methods.

Referring to FIG. 4, a control unit 600 may recognize a wall surface W by recognizing a specific pattern from an image of a space photographed by a camera 100. The wall surface W may be in the form of a tile or wallpaper having a repeating pattern, and a space recognition unit 610 may recognize a plane including such a pattern as a plane on which an imaging device is installable. The control unit 600 may control a display 310 to display a grid 20 on the recognized wall surface W.

Referring to FIG. 5, the control unit 600 may recognize a wall surface W by recognizing a specific object from an image of a space photographed by the camera 100. Since a specific object such as a picture frame may be mounted on the wall surface W, the space recognition unit 610 may recognize a plane including the specific object as a plane on which an imaging device is installable. The control unit 600 may control the display 310 to display a grid 20 on the recognized wall surface W.

Referring to FIG. 6, the control unit 600 may display a guide line for recognizing a plane on the display 310. The control unit 600 may display an image of a space photographed by the camera 100 and the guide line together on the display 310 and may recognize a plane based on the guide line. Specifically, when the guide line displayed on the display 310 is aligned with a boundary line between a wall surface W and a floor surface 10, the control unit 600 may recognize an upper surface as the wall surface W and recognize a lower surface as the floor surface 10 based on the guide line. The control unit 600 may control the display 310 to display a grid 20 on the recognized wall surface W.

As described above, a space or a plane in which an imaging device is installable can be automatically recognized so that it can be easier for a user to simulate the installation of the imaging device. In addition, a grid is displayed on a plane in which an imaging device is installable so that a user can easily adjust a size of the imaging device to perform a simulation. Furthermore, a virtual image of an imaging device having a size equal to a size of an actual imaging device is displayed, thereby performing a more realistic simulation.

Figure 7:
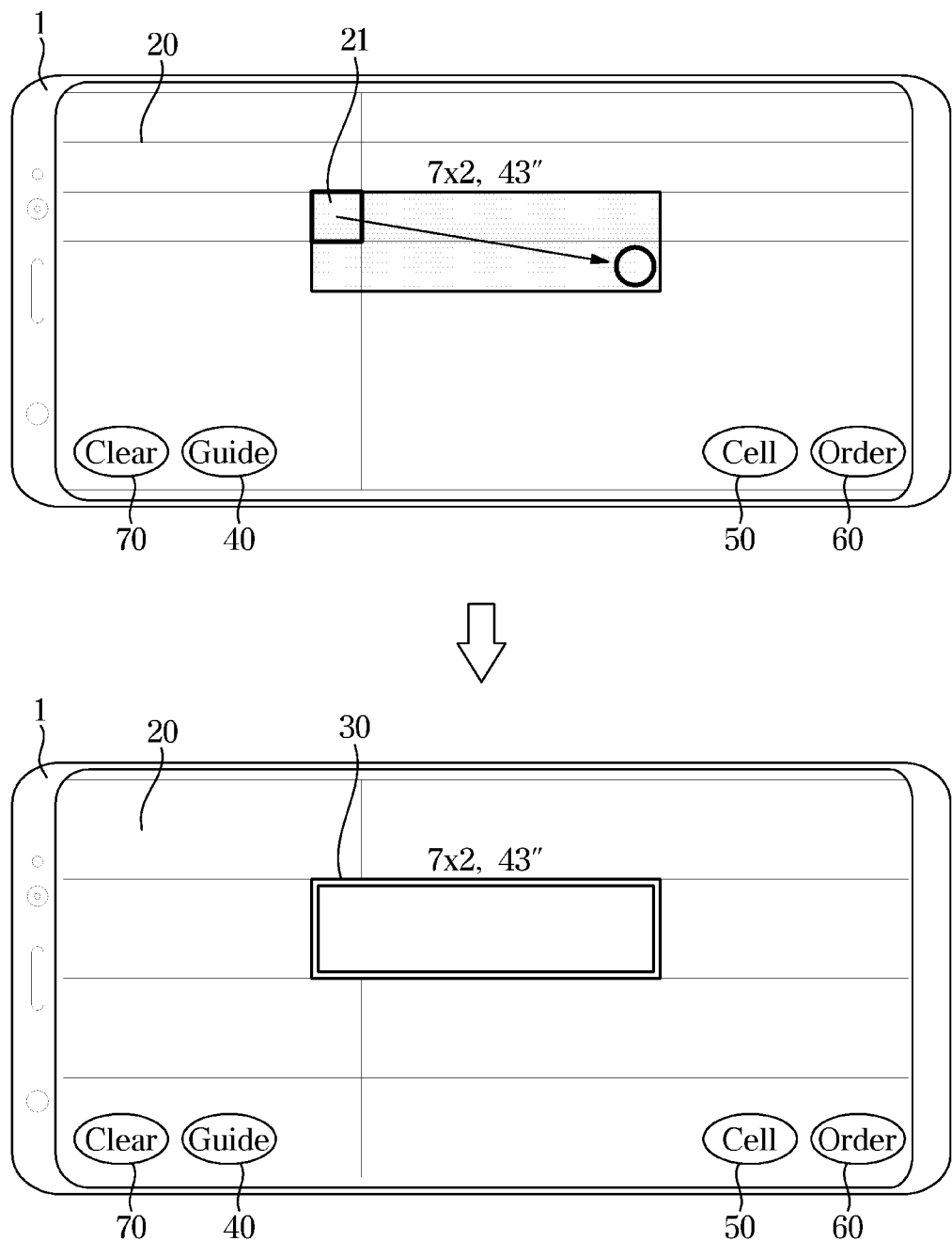
FIGS. 7 to 9 are diagrams for describing the display of a virtual image of an imaging device.
Figure 8:
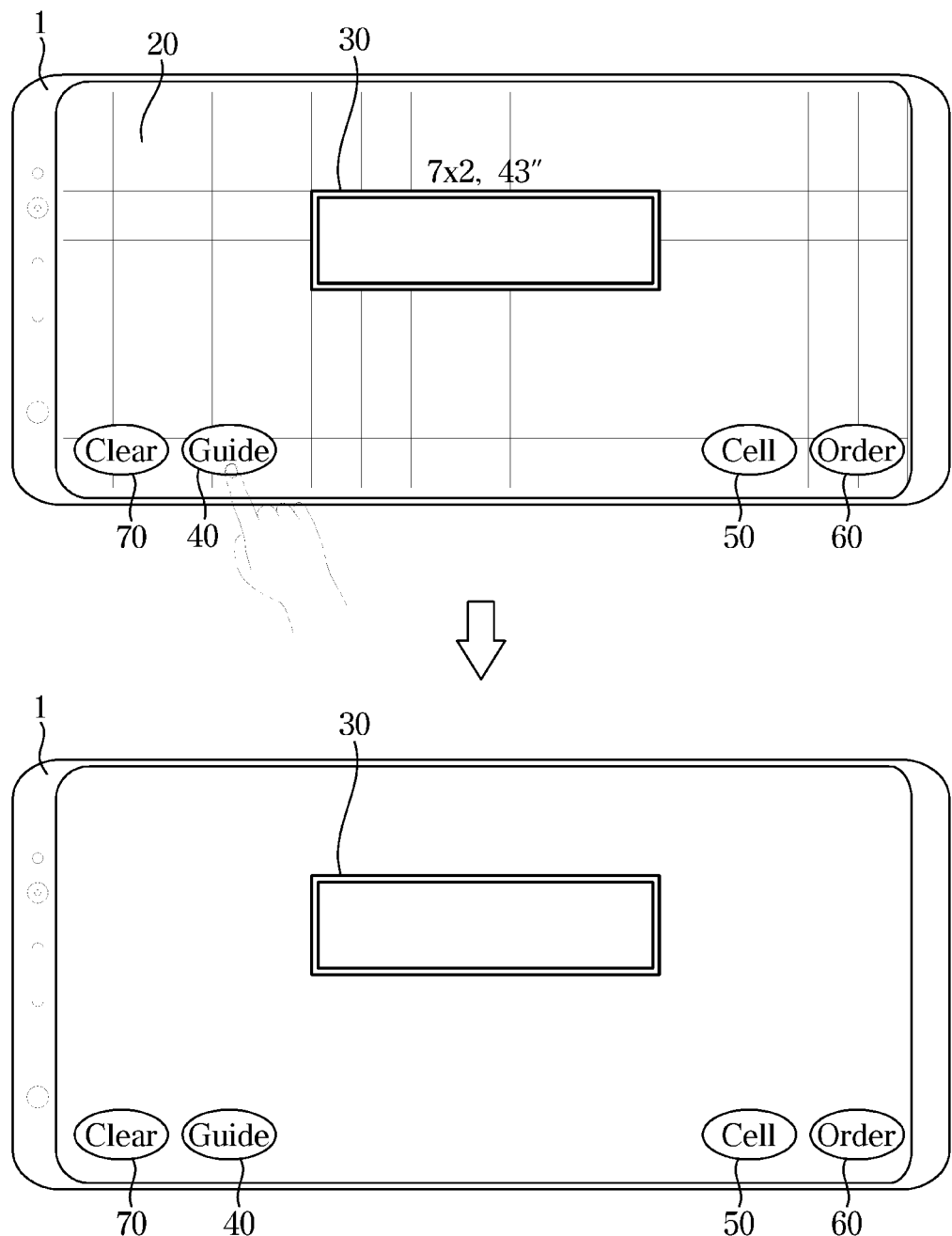
Figure 9:
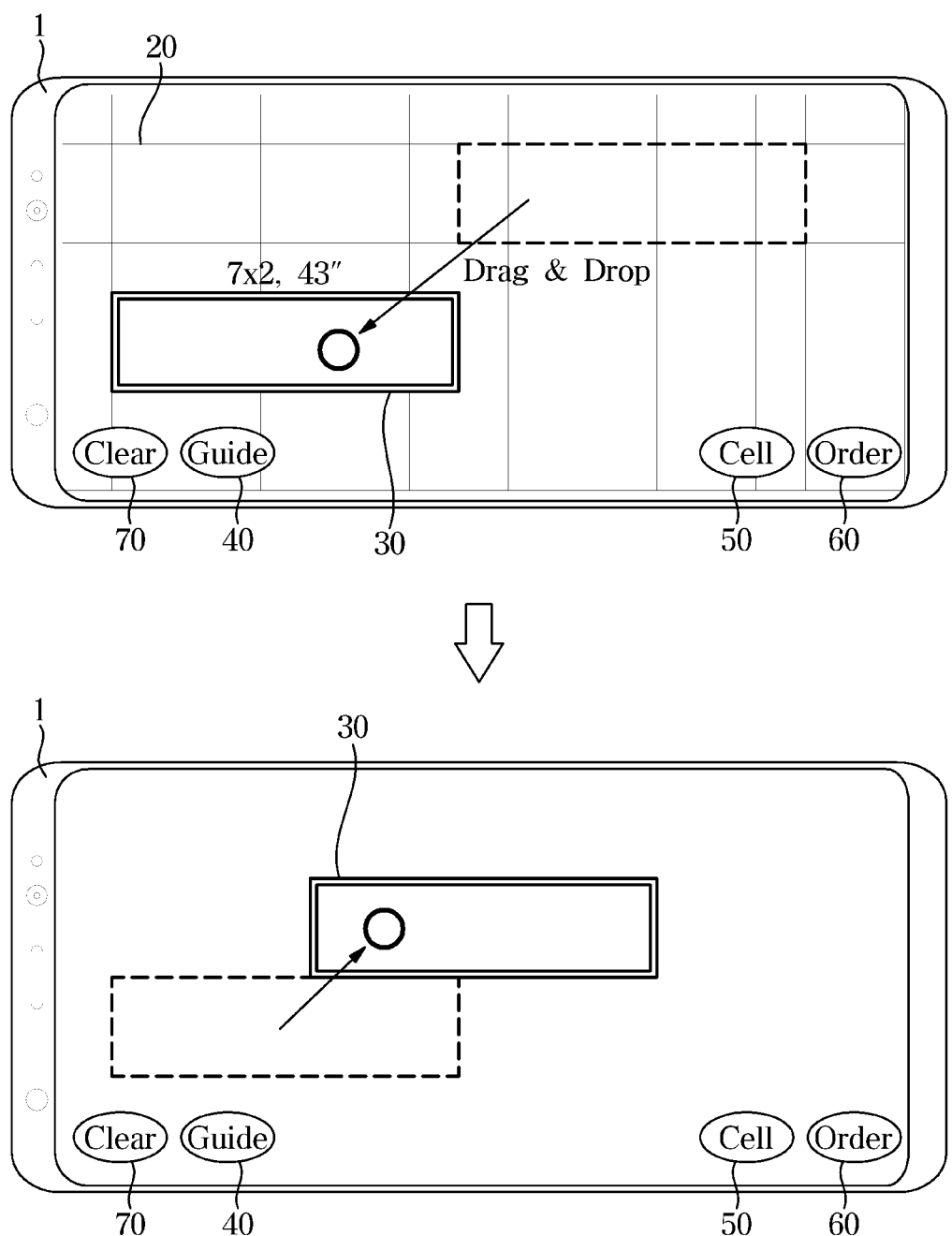

FIGS. 7 to 9 are diagrams for describing the display of a virtual image of an imaging device.

Referring to FIG. 7, in response to a user input of selecting at least one cell 21 included in a grid 20, a control unit 600 may control a display 310 to display a virtual image 30 of an imaging device on the selected at least one cell 21. Specifically, a user may select a plurality of cells 21 by touching the cell 21 at any position on the grid 20 and dragging and dropping the cell 21. The control unit 600 may generate the virtual image 30 of the imaging device having a size corresponding to the plurality of selected cells 21 and may display the virtual image 30 on the display 310.

In this case, the virtual images 30 of the imaging device may be displayed after the plurality of cells 21 are selected or may be sequentially displayed according to the order of the selected cells 21 while the plurality of cells 21 are selected. In addition, the control unit 600 may control the display 310 to distinguish and display the selected cells 21 while the plurality of cells 21 are selected. For example, a color of the selected cell 21 may be changed and displayed.

FIG. 7 shows the virtual image 30 of the imaging device having a size (43 inches) corresponding to 14 (7×2) cells. A size of one cell 21 may be preset so as to correspond to a size of an actual imaging device. The grid 20 may be provided with the plurality of cells 21 having a certain size, and a user may control the number of the cells 21 to be selected, thereby variously adjusting a size of a virtual image of an imaging device.

In addition, a size of one cell 21 may be changed in response to a user input. The change of the size of the cell 21 will be described in detail with reference to FIGS. 10 and 11.

In addition, the control unit 600 may display a GUI required to simulate the installation of an imaging device on the display 310. Specifically, the control unit 600 may generate and display a guide icon 40 for setting whether to display a grid 20, a cell icon 50 for changing a size of a cell 21, an order icon 60 for requesting purchase information corresponding to a displayed virtual image 30 of an imaging device or a purchase, and a clear icon 70 for deleting the displayed virtual image 30 of the imaging device on the display 310.

Referring to FIG. 8, when a user touches the guide icon 40, the grid 20 displayed on the display 310 may be removed. That is, the control unit 600 may control the display 310 to only display an image of a space photographed by a camera 100 and the virtual image 30 of the imaging device. Therefore, the user can more easily determine how the imaging device may be installed on a wall surface W of a real space.

In this case, even when the user moves a mobile device 1 to change a direction in which the camera 100 faces, the virtual image 30 of the imaging device may be displayed as if the imaging device is fixed to the wall surface of the real space.

In addition, when the camera 100 faces another area of the wall surface W, the user may connect and select the cell 21 of the grid 20 displayed on another area of the wall surface W. In other words, when a user input of selecting the cells 21 is maintained within the grid 20, the control unit 600 may connect the cell 21 that has already been selected and thus is not displayed on the display 310 to the cell 21 that is displayed on the display 310 and selected. Therefore, when the user selects the cell 21 of the grid 20, a facing direction of the camera 100 does not need to be fixed.

Referring to FIG. 9, in response to a user input of changing a position of a virtual image 30 of an imaging device, the control unit 600 may change a position at which the virtual image 30 of the imaging device is displayed. That is, according to a drag-and-drop input of a user, the position of the virtual image 30 of the imaging device may be changed and displayed on a grid 20 or a wall surface W.

Figure 10:
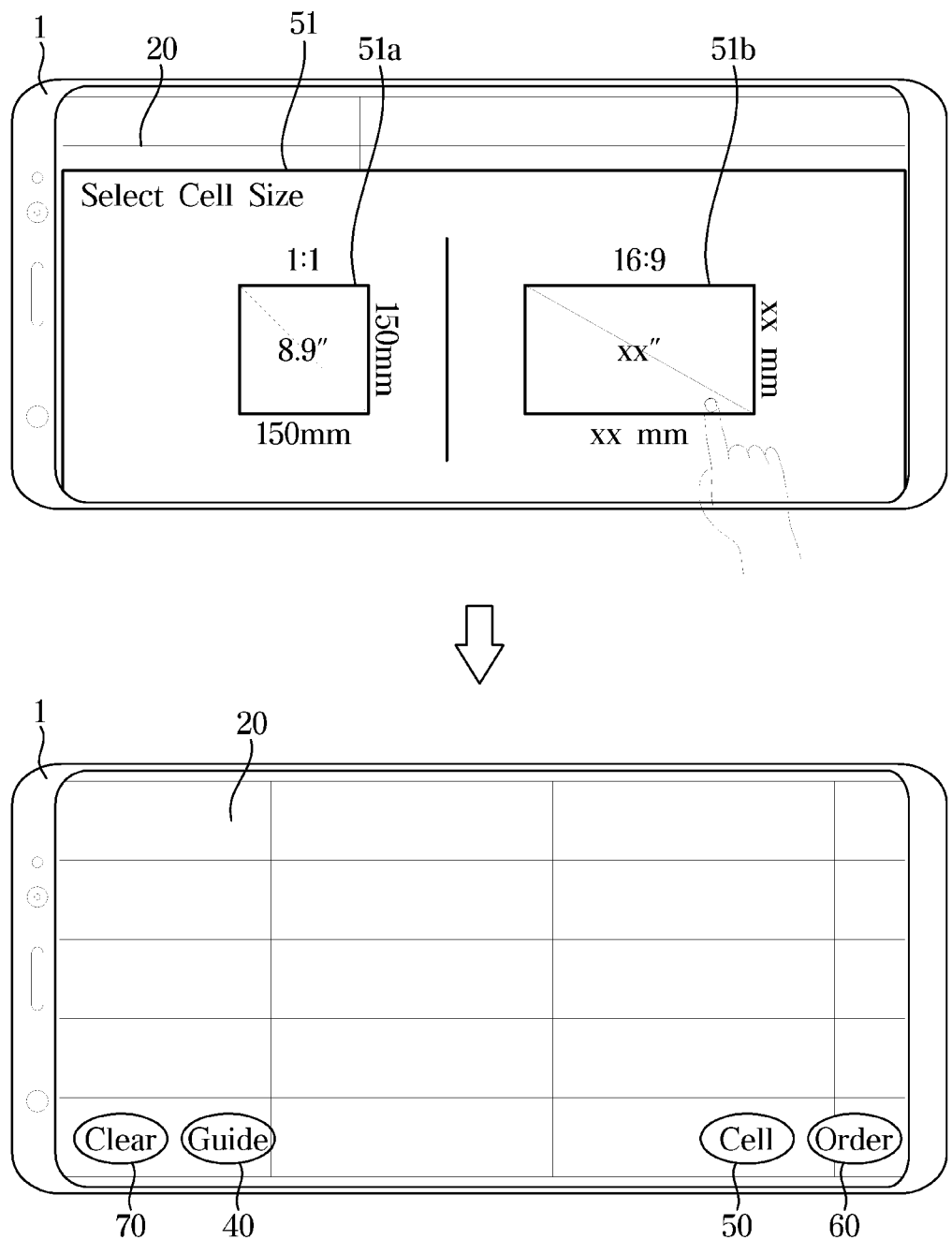
FIGS. 10 and 11 are diagrams for describing a change in cell size of a grid.
Figure 11:
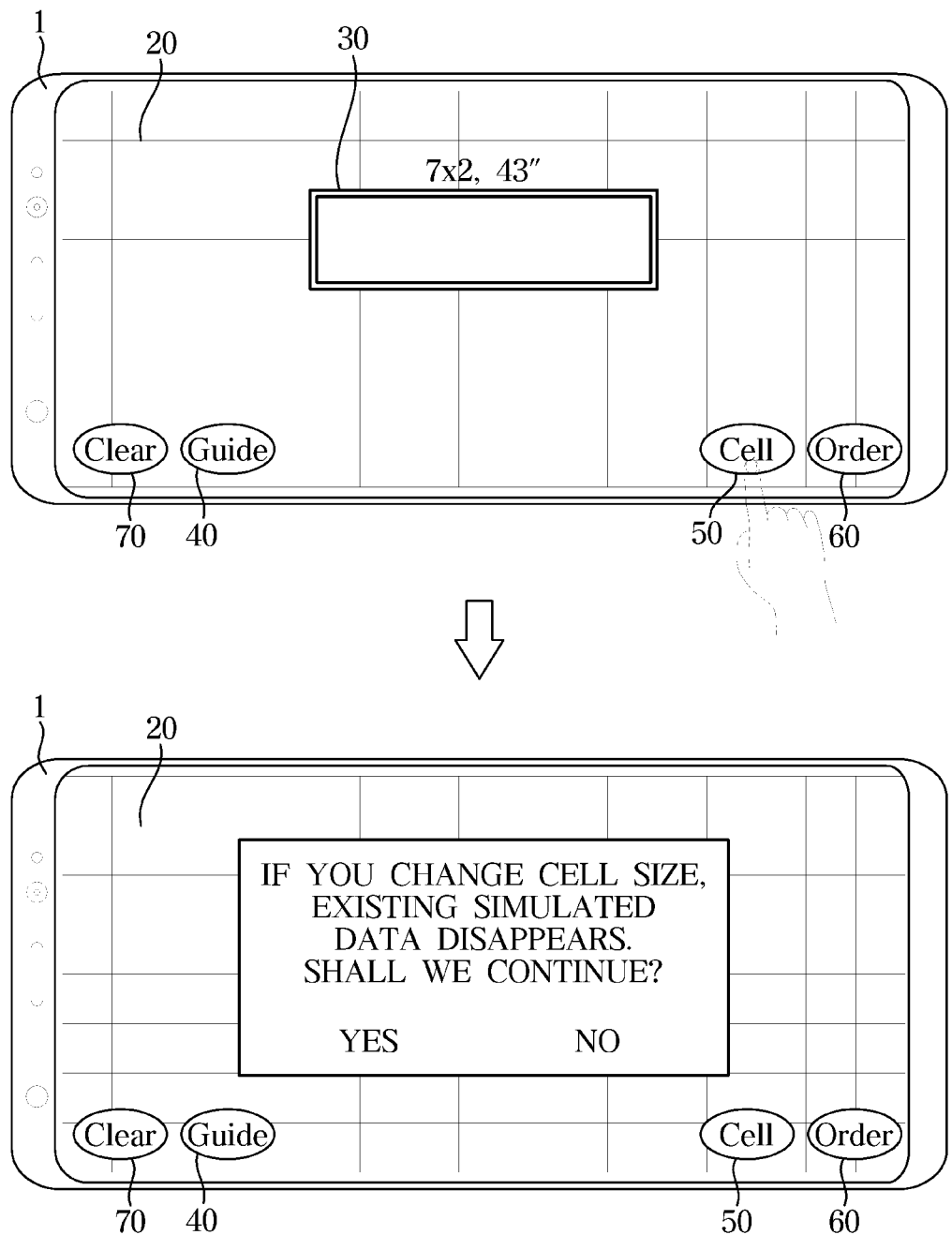

FIGS. 10 and 11 are diagrams for describing a change in cell size of a grid.

Referring to FIG. 10, in response to a user input of changing a size of a cell 21 of a grid 20, a control unit 600 may change a size of a unit cell 21 of the grid 20. When a user performs a touch input on a cell icon 50, the control unit 600 may generate and display a size menu 51 of the unit cell 21 on a display 310.

The size menu 51 of the unit cell may be provided to select a unit cell 51a having a horizontal length to vertical length ratio of 1:1 or a unit cell 51b having a horizontal length to vertical length ratio of 16:9. A horizontal length, a vertical length, and a ratio of the horizontal length to the vertical length of the unit cell 21 may be variously determined according to an actual size of an imaging device. In addition, a size of the unit cell 21 may be determined according to a size of a display module that is to constitute the imaging device.

In FIG. 10, when the grid 20 having the unit cell 51a with a ratio of 1:1 is displayed on the display 310, in response to a user input of selecting the unit cell 51b with a ratio of 16:9, the control unit 600 displays the grid 20 having the unit cell with a ratio of 16:9 on the display 310.

Referring to FIG. 11, before a grid 20 having a cell 21 with a changed size is displayed, the control unit 600 may generate and display a query screen for determining a change of the grid 20 on the display 310. Specifically, when a user touch is performed on a cell icon 50 in a state in which a virtual image 30 of an imaging device is displayed on the grid 20, the control unit 600 may display a screen including a query such as a message "If you change cell size, existing simulated data disappears. Shall we continue?" on the display 310. Therefore, it is possible to prevent simulation data from being deleted due to an incorrect input of a user or an unintentional input of the user.

FIGS. 12 to 16 are diagrams for describing the additional displaying of a virtual image of an imaging device.

In response to a user input of selecting an additional cell on a grid 20, a control unit 600 may control a display 310 to display a virtual image 31 of an additional imaging device on the selected additional cell.

Figure 12:
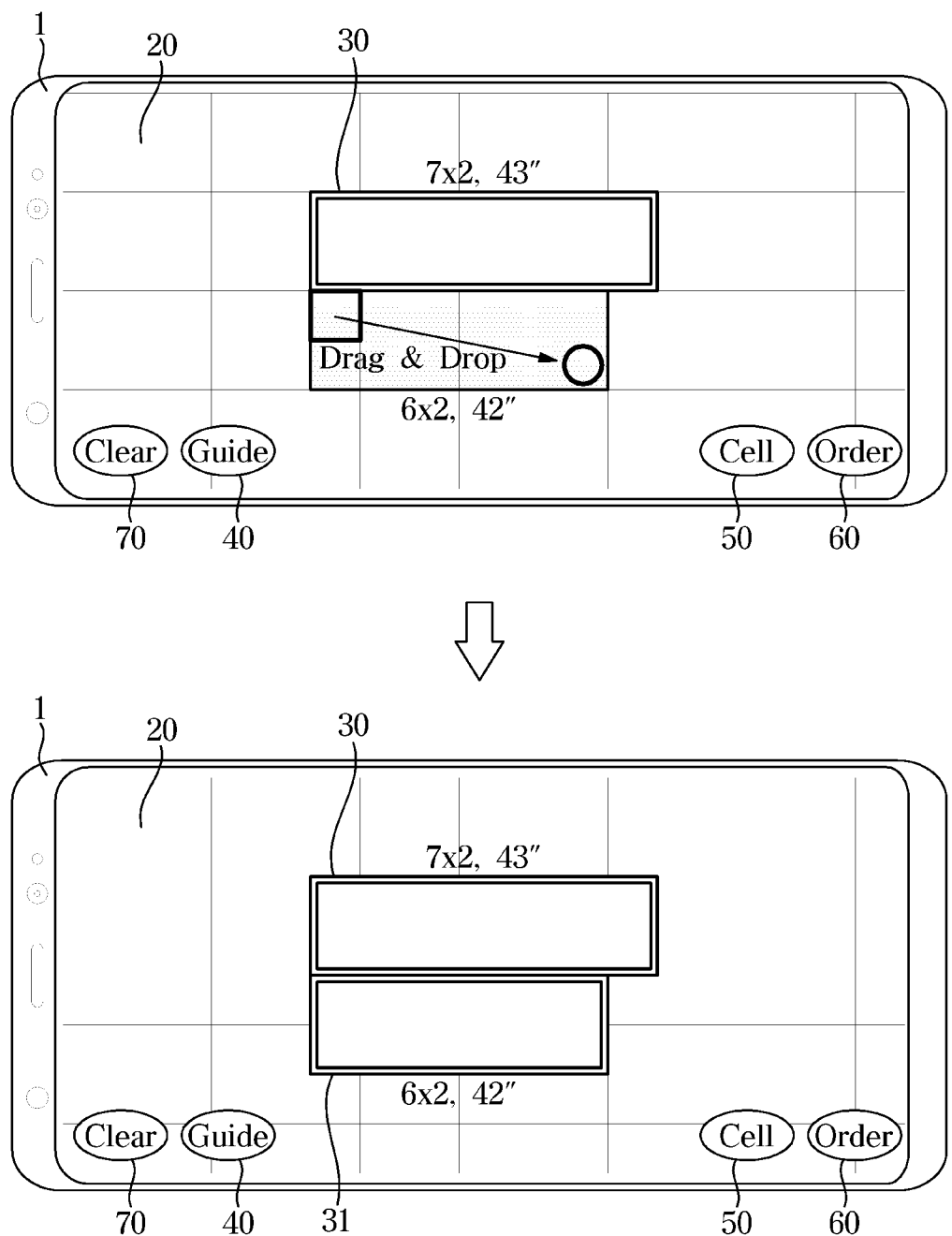
Figure 13:
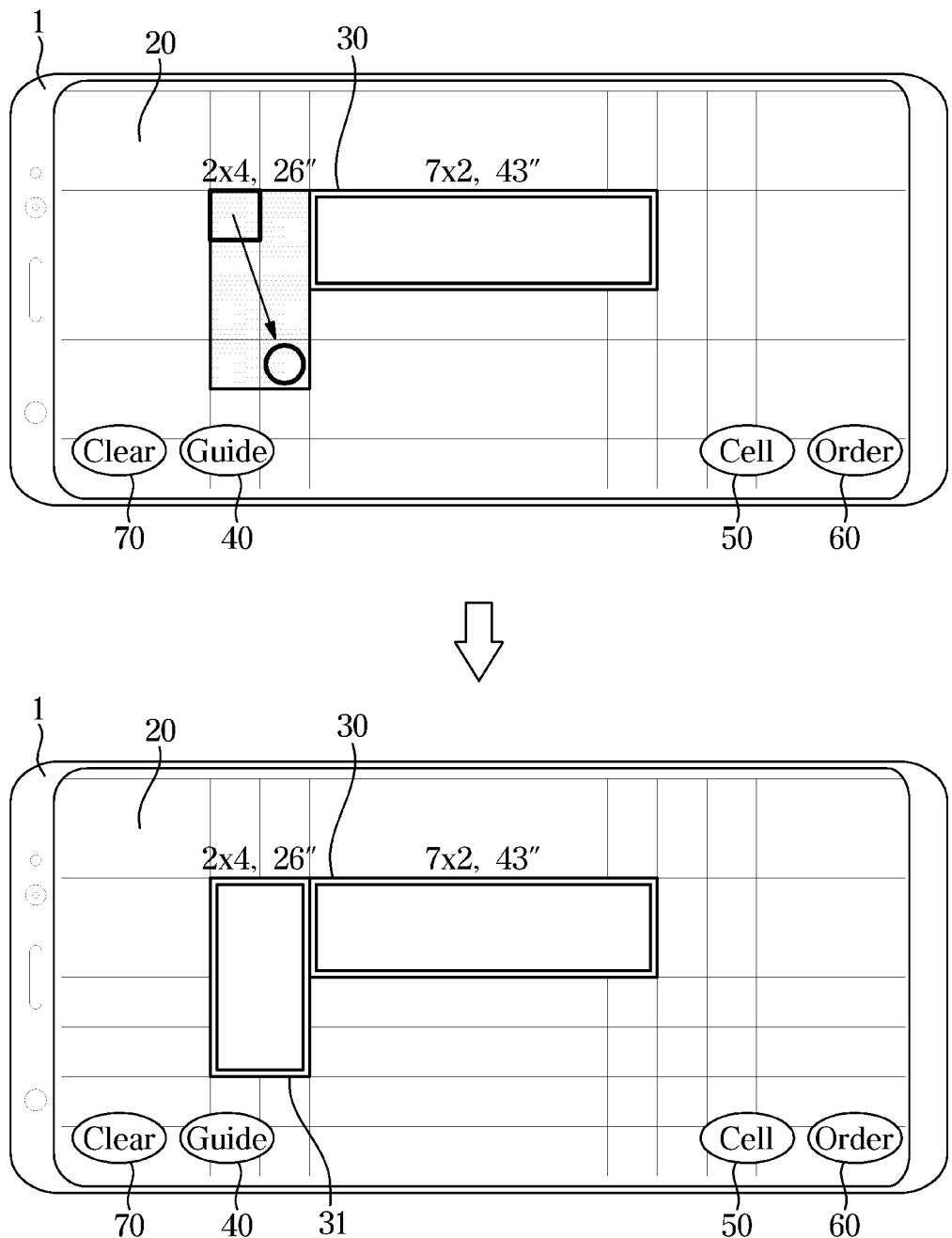

Referring to FIGS. 12 and 13, when a user selects a number of cells 21 different from the number of cells 21 corresponding to a virtual image 30 of an imaging device which is already present on the grid 20, the control unit 600 may display the virtual image 30 of the existing imaging device and the virtual image 31 of the additional imaging device on the display 310 so as to be distinguished from each other.

For example, when the virtual image 30 of the existing imaging device includes 14 (7×2) cells, and the number of additionally selected cells is 12 (6×2) or 8 (2×4), the control unit 600 may control the display 310 to display the virtual image 30 of the existing imaging device and the virtual image 31 of the additional imaging device so as to be distinguished from each other.

In other words, when a horizontal or vertical length of the additional imaging device corresponding to the plurality of additionally selected cells is different from a horizontal or vertical length of the virtual image 30 of the existing imaging device, the virtual image 31 of the additional imaging device may be displayed so as to be distinguished from the virtual image 30 of the existing imaging device.

In addition, when a user selects additional cells so as to include an area of a virtual image 30 of an existing imaging device, the control unit 600 may allow a virtual image of the additional imaging device to be displayed only in an area excluding the area of the virtual image 30 of the existing imaging device.

Figure 14:
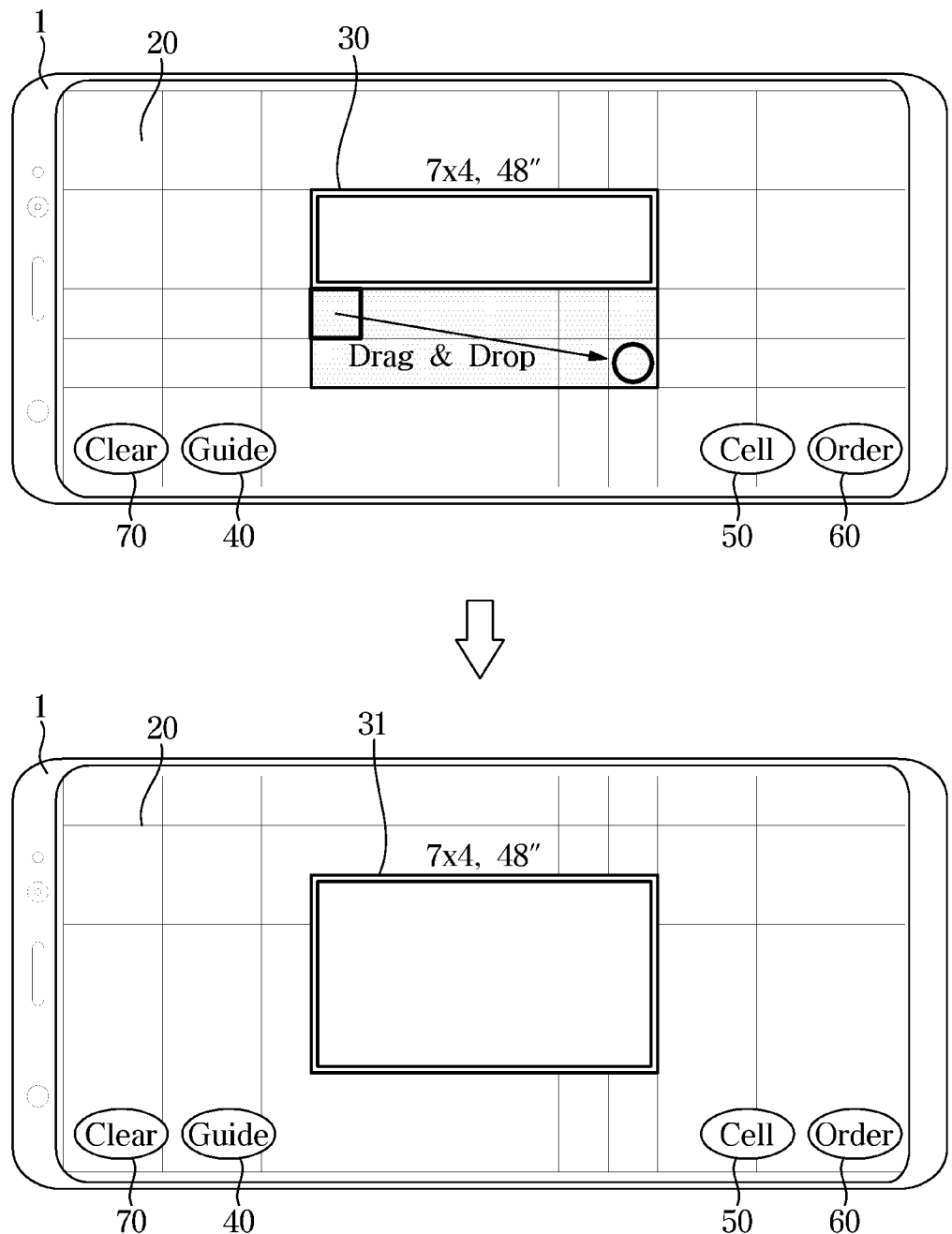

Alternatively, referring to FIG. 14, the same number of cells 21 as the number of cells 21 included in a virtual image 30 of an existing imaging device may be selected in an area connected to an area of the virtual image 30 of the existing imaging device. In this case, the control unit 600 may connect the virtual image 30 of the existing imaging device and a virtual image of an additional imaging device to display a virtual image 31 of the imaging device having an expanded size on the display 310.

In addition, referring to FIG. 15, when additional cells are selected in another area not connected to an area in which a virtual image 31 of an existing imaging device is displayed, the virtual image 31 of the existing imaging device and a virtual image 32 of an additional imaging device may be displayed so as to be distinguished from each other.

Figure 16:
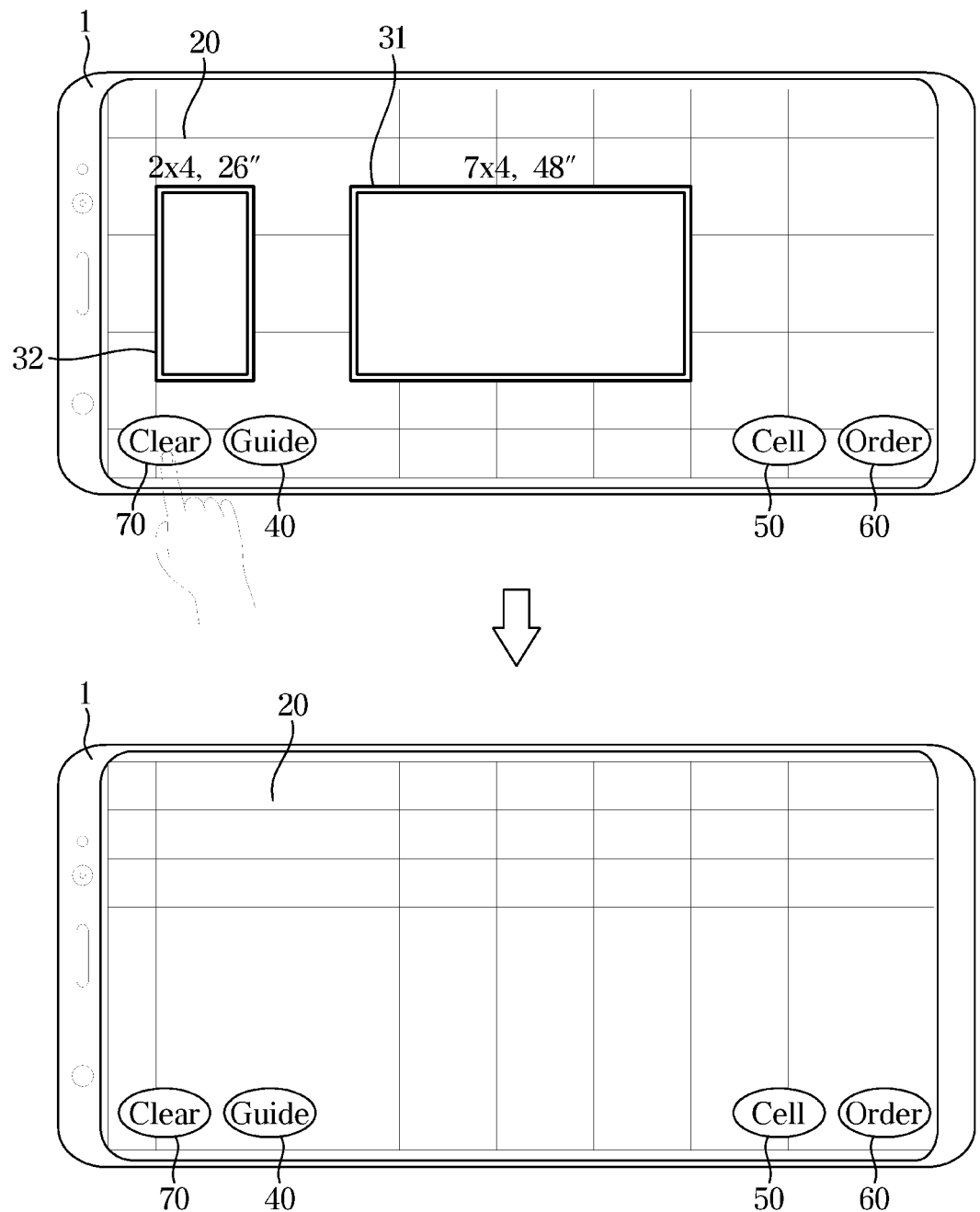

Meanwhile, referring to FIG. 16, when a user performs a touch input on a clear icon 70 in a state in which virtual images 31 and 32 of imaging devices are displayed on a grid 20, the virtual images 31 and 32 of the imaging devices may be deleted.

As described above, a user can easily adjust the size and number of virtual images of imaging devices, thereby variously simulating the installation of the imaging device.

Figure 17:
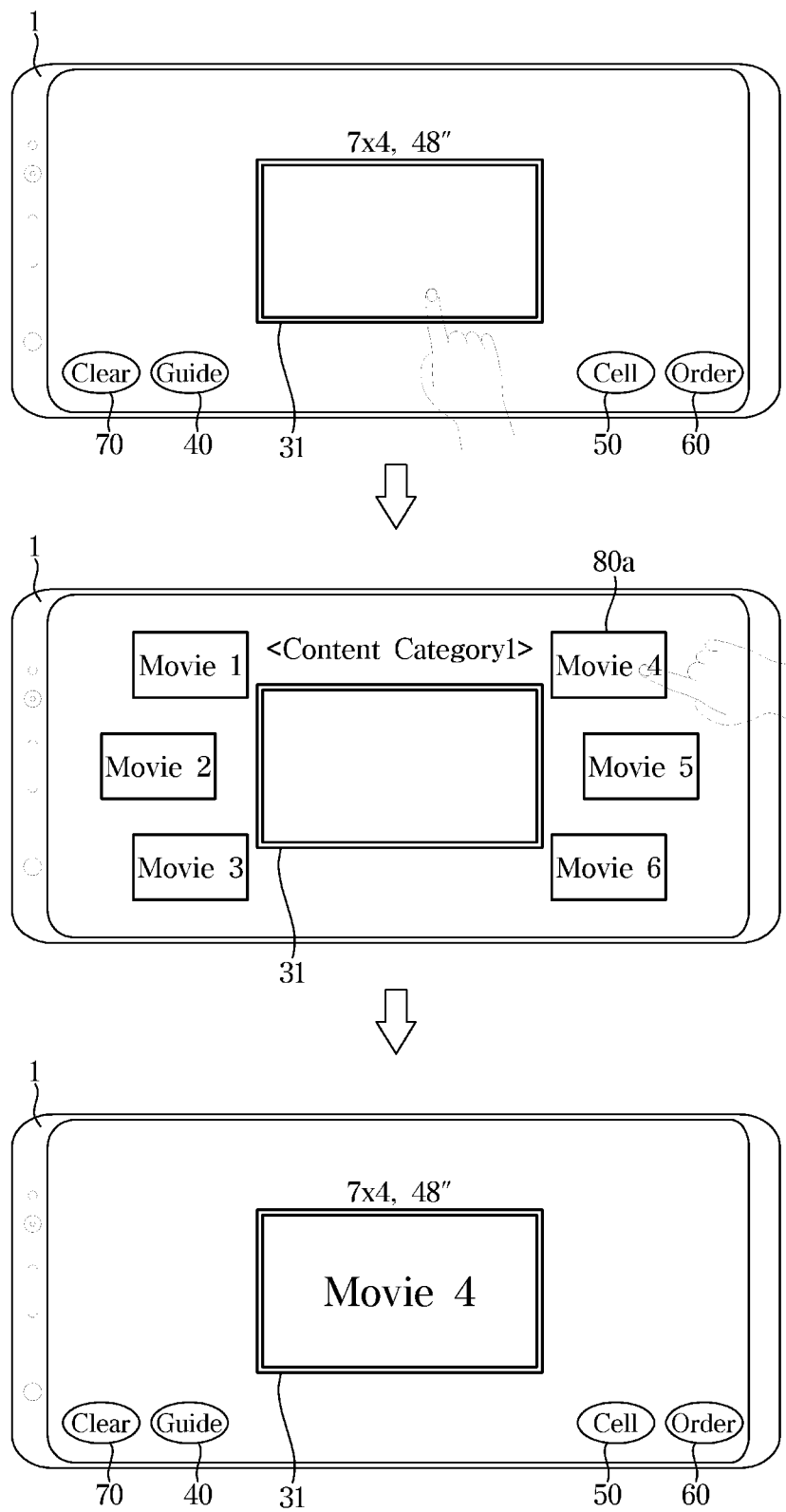
FIGS. 17 and 18 are diagrams for describing the display of content on a virtual image of an imaging device.
Figure 18:
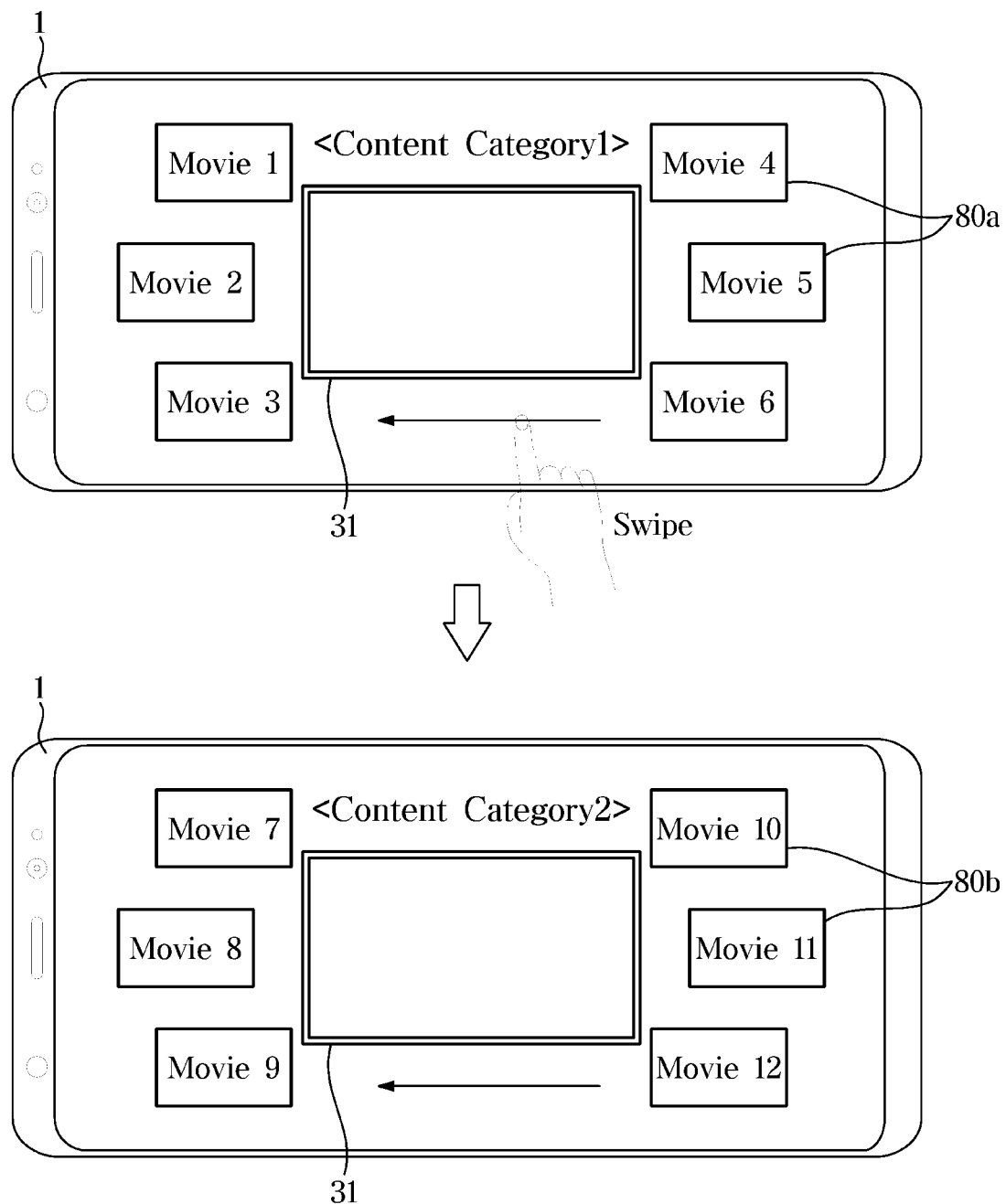

FIGS. 17 and 18 are diagrams for describing the display of content on a virtual image of an imaging device.

Referring to FIG. 17, in response to a user input of selecting a virtual image 31 of an imaging device, a control unit 600 may control a display 310 to display one or more virtual content images 80*a* around the virtual image 31 of the imaging device.

Specifically, when a user performs a touch input on the virtual image 31 of the imaging device, the virtual content image 80*a* including a thumbnail image of content reproducible in the virtual image 31 of the imaging device may be generated and displayed on the display 310.

One or more virtual content images 80*a* may be arranged in various patterns. For example, one or more virtual content images 80*a* may be arranged in a circular shape so as to surround the virtual image 31 of the imaging device or may be arranged vertically or diagonally based on the virtual image 31 of the imaging device.

In addition, in response to a user input of selecting any one virtual content image of one or more virtual content images 80*a*, the control unit 600 may control the display 310 to display first content corresponding to the selected virtual content image 80*a* in an area of the virtual image 31 of the imaging device.

That is, in FIG. 17, when a user selects the virtual content image 80*a* including content information about Movie 4 among the virtual content images 80*a*, Movie 4 may be played in an area of the virtual image 31 of the imaging device. One or more virtual content images 80*a* may include different pieces of content information, and Movie 4 may be a video.

Referring to FIG. 18, one or more virtual content images 80*a* may be displayed according to categories. Content for each category may be stored in a storage unit 500. For example, content for each category may be classified into a music video category, a movie category, a photo category, and the like, and content corresponding to each category may be stored in the storage unit 500.

In a state in which one or more virtual content images 80*a* corresponding to a first category are displayed around a virtual image 31 of an imaging device, when a swipe gesture of a user is input to any area on the display 310, the control unit 600 may display one or more virtual content images 80*b* corresponding to a second category, which are around the virtual image 31 of the imaging device, on the display 310. In this case, one or more virtual content images 80*a* corresponding to the first category may not be displayed on the display 310 and may be displayed again according to a swipe gesture input of a user.

As described above, various pieces of content belonging to various categories can be produced in an area of a virtual image of an imaging device so that a user can perform a more realistic simulation.

Figure 19:
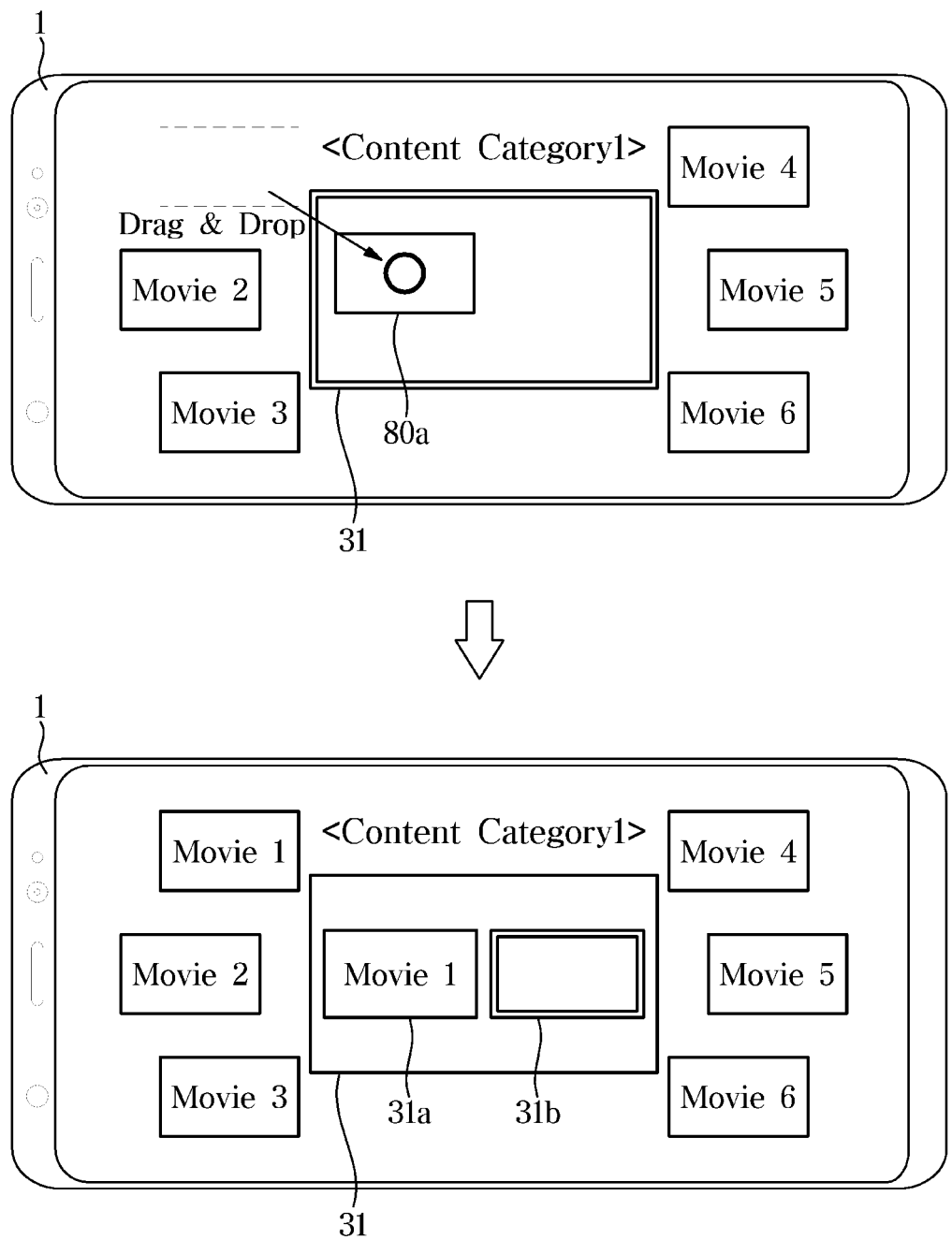

FIGS. 19 and 20 are diagrams for describing the display of content by dividing an area of a virtual image of an imaging device.

Referring to FIG. 19, in response to a user input of additionally selecting a virtual content image, a control unit 600 may divide an area of a virtual image 31 of an imaging device into a first area 31*a* and a second area 31*b* and may control a display 310 to display first content and second content corresponding to the additionally selected virtual content image in the first area 31*a* and the second area 31*b*, respectively. In addition, the control unit 600 may change positions of the first area 31*a* and the second area 31*b* in response to a user input.

Specifically, in a state in which the first content is displayed in an area of the virtual image 31 of the imaging device, when a user inputs a gesture for selecting a virtual content image including second content information and moving the selected virtual content image to the area of the virtual image 31 of the imaging device, both the first content and the second content may be displayed in the area of the virtual image 31 of the imaging device.

That is, in response to a user input, the control unit 600 may divide the area of the virtual image 31 of the imaging device into a plurality of areas and may simultaneously display a plurality of pieces of content in the plurality of divided areas.

On the other hand, referring to FIG. 20, in a state in which both first content and second content are displayed in an area of a virtual image 31 of an imaging device, when a gesture for selecting a first content display area and moving the selected first content display area outside the area of the virtual image 31 of the imaging device is input, a virtual content image 80*a* corresponding to the first content may be displayed again outside the area of the virtual image 31 of the imaging device. In this case, the second content may be displayed in the area of the virtual image 31 of the imaging device.

As described above, the area of the virtual image 31 of the imaging device can be divided into a plurality of areas to simultaneously display a plurality of pieces of content so that a user can realistically simulate the installation of a multi-screen.

In addition, as described above, according to a mobile device and a method of controlling the mobile device according to one aspect, since a virtual image corresponding to an imaging device with an actual size is displayed together with an image of a real space in which the imaging device is to be installed, a user can realistically simulate the installation of the imaging device.

Furthermore, according to a mobile device and a method of controlling the mobile device according to one aspect, content is displayed in an area of a virtual image corresponding to an imaging device with an actual size, thereby performing a more realistic simulation of the installation of the imaging device.

Figure 21:
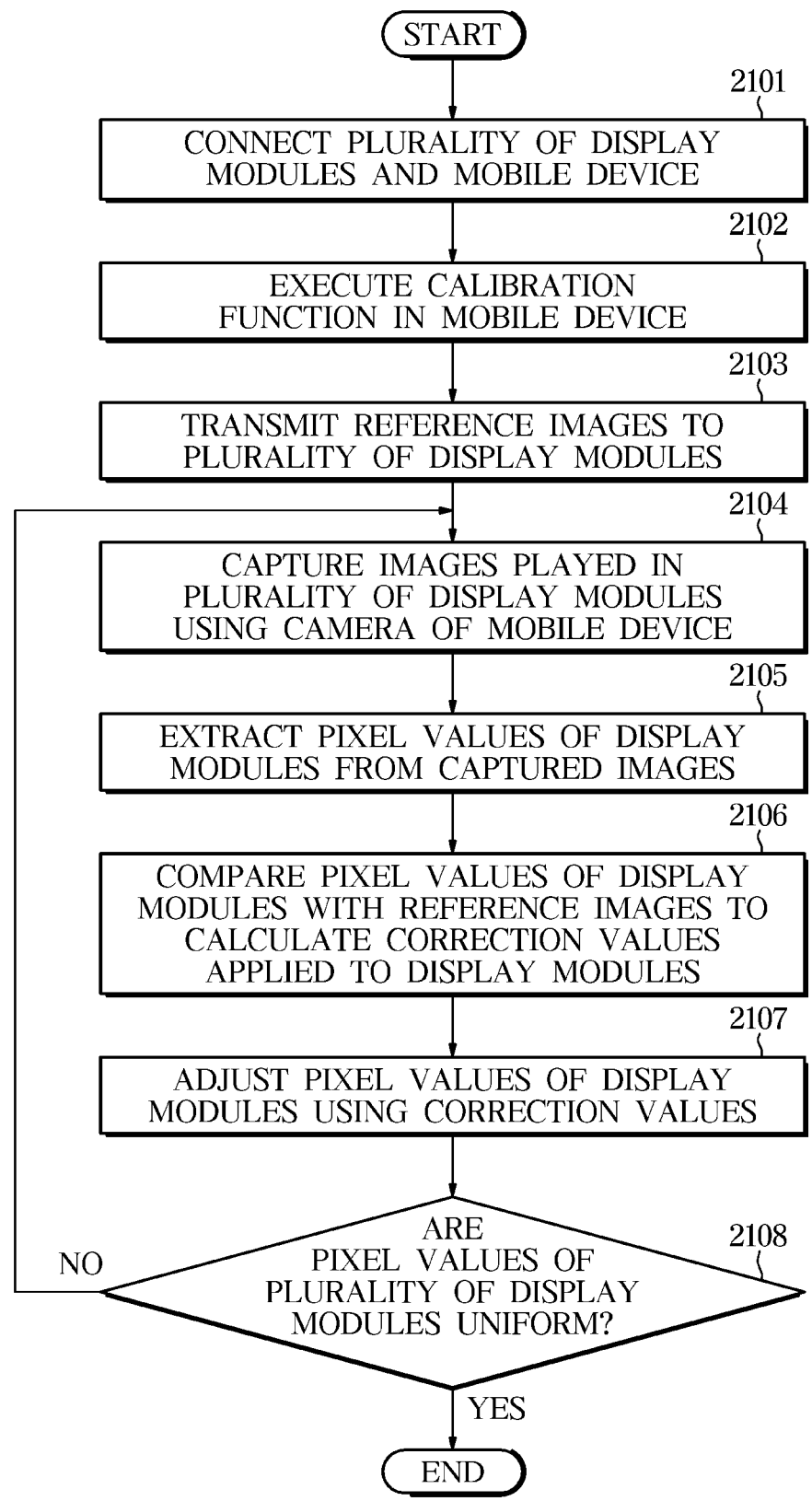
FIG. 21 is a flowchart of a method of controlling a mobile device according to another embodiment.

FIG. 21 is a flowchart of a method of controlling a mobile device according to another embodiment. Specifically, FIG. 21 illustrates a method of performing calibration on pixel values of a display device including a plurality of display modules using a camera 100 of a mobile device 1.

Referring to FIG. 21, the mobile device 1 is connected to each of a plurality of display modules S1, S2, S3, S4, S5, S6, S7, and S8 through a communication unit 400 (2101). A control unit 600 of the mobile device 1 executes a calibration function in response to a user input (2102). The calibration function may be executed by executing an application for calibration.

The control unit 600 of the mobile device 1 transmits reference images stored in a storage unit 500 to the plurality of display modules S1, S2, S3, S4, S5, S6, S7, and S8 through the communication unit 400 (2103). The reference image refers to an image having a reference pixel value in a calibration process. The plurality of display modules S1, S2, S3, S4, S5, S6, S7, and S8 may all display the same reference image. In addition, the plurality of display modules S1, S2, S3, S4, S5, S6, S7, and S8 may display different reference images.

A camera 100 of the mobile device 1 photographs a display device including the plurality of display modules S1, S2, S3, S4, S5, S6, S7, and S8 and acquires images of the plurality of display modules S1, S2, S3, S4, S5, S6, S7, and S8 that display the reference images (2104).

The control unit 600 extracts pixel values of the plurality of display modules S1, S2, S3, S4, S5, S6, S7, and S8 from the images of the plurality of display modules S1, S2, S3, S4, S5, S6, S7, and S8 that display the reference images (2105).

Each of the plurality of display modules S1, S2, S3, S4, S5, S6, S7, and S8 includes a plurality of pixels, and each of the plurality of pixels has pixel values such as a color, luminance, and brightness. In addition, since the plurality of display modules S1, S2, S3, S4, S5, S6, S7, and S8 independently receive power and independently operate, the display modules S1, S2, S3, S4, S5, S6, S7, and S8 may have different pixel values.

When the plurality of display modules S1, S2, S3, S4, S5, S6, S7, and S8 have different pixel values, a user who views the display device may feel eye strain. Therefore, the pixel values of the display modules S1, S2, S3, S4, S5, S6, S7, and S8 need to be adjusted to be uniform.

The control unit 600 compares the extracted pixel values of the display modules S1, S2, S3, S4, S5, S6, S7, and S8 with the reference images and calculates correction values to be applied to the display modules S1, S2, S3, S4, S5, S6, S7, and S8 (2106). The control unit 600 controls the plurality of display modules S1, S2, S3, S4, S5, S6, S7, and S8 using the calculated correction values such that the pixel values of the plurality of display modules S1, S2, S3, S4, S5, S6, S7, and S8 become uniform (2107).

When a difference between the pixel values of the plurality of display modules S1, S2, S3, S4, S5, S6, S7, and S8 is within a preset range, the control unit 600 determines that the pixel values of the plurality of display modules S1, S2, S3, S4, S5, S6, S7, and S8 are uniform, thereby ending a calibration process (2108).

When the difference between the pixel values of the plurality of display modules S1, S2, S3, S4, S5, S6, S7, and S8 is out of the preset range, the control unit 600 may control the camera 100 to again photograph the plurality of display modules S1, S2, S3, S4, S5, S6, S7, and S8 that display images with corrected pixel values. Thereafter, the control unit 600 repeatedly performs a calibration process based on an image captured by the camera 100.

As described above, instead of manually adjusting pixel values of a plurality of display modules, the pixel values of the plurality of display modules can be calibrated using the camera 100 of the mobile device 1. Accordingly, it is possible to increase user convenience in performing calibration, and it is possible to reduce the time required for calibration.

Meanwhile, the provided embodiments can be implemented as recording media storing computer-executable instructions. The instructions can be stored in the form of program code, and generate, when executed by a processor, a program module such that the operation of the provided embodiments can be performed. The recording media can be implemented as computer-readable recording media.

The computer-readable recording media include all types of recording media in which instructions that can be read by a computer are stored. Examples of the computer-readable recording media include a read only memory (ROM), a random access memory (RAM), a magnetic tape, a magnetic disc, a flash memory, an optical data storage device, and the like.

The disclosed embodiments have been described above with reference to the accompanying drawings. It will be understood by those of ordinary skill in the art to which the disclosed embodiments belong that the disclosed embodiments can be implemented in different forms from the disclosed embodiments without departing from the spirit and scope of the disclosed embodiments. The disclosed embodiments are illustrative and should not be construed as restrictive.

The invention claimed is:

1. A mobile device comprising:
   a display;
   a camera configured to photograph a space, the space including a space where an imaging device, which is an electronic device capable of displaying an image, is to be simulated to be installed;
   a user interface unit configured to receive a user input; and
   a control unit configured to:
   control the display to display an image of the space photographed by the camera together with a grid,
   control the display to display a virtual image of the imaging device on the grid, the virtual image of the imaging device having an adjusted size on the grid in response to the user input,
   in response to the user input of selecting the virtual image of the imaging device, control the display to display a plurality of virtual content images around the virtual image of the imaging device,
   in response to the user input of selecting any one virtual content image of the plurality of virtual content images, control the display to display first content corresponding to the selected virtual content image in an area of the virtual image of the imaging device, and
   in response to the user input of additionally selecting the virtual content image, divide the area of the virtual image of the imaging device into a first area and a second area and control the display to display the first content and second content corresponding to the additionally selected virtual content image in the first area and the second area, respectively.

2. The mobile device of claim 1, wherein, in response to the user input of selecting at least one cell included in the grid, the control unit controls the display to display the virtual image of the imaging device on the selected at least one cell.

3. The mobile device of claim 1, wherein the control units recognizes at least one of a specific pattern and a specific object from the image of the space to recognize a plane on which the imaging device is installable and controls the display to display the grid on the recognized plane.

4. The mobile device of claim 3, wherein the control unit controls the display to display the image of the space and a guide line together, recognizes the plane based on the guide line, and controls the display to display the grid on the recognized plane.

5. The mobile device of claim 1, wherein, in response to the user input of changing a size of a cell of the grid, the control unit controls the display to display the grid having the cell with the changed size together with the image of the space.

6. The mobile device of claim 1, wherein, the plurality of virtual content images displayed around the virtual image of the imaging device comprising one or more thumbnail images of virtual content reproducible in an area of the virtual image of the imaging device.

7. A mobile device comprising:
a display;
a camera configured to photograph a space, the space including a space where an imaging device, which is an electronic device capable of displaying an image, is to be simulated to be installed;
a user interface unit configured to receive a user input;
a control unit configured to control the display to display an image of the space photographed by the camera together with a grid and control the display to display a virtual image of the imaging device having an adjusted size on the grid in response to the user input; and
a communication unit connected to an external server,
wherein the control unit acquires purchase information about the imaging device corresponding to the virtual image of the imaging device from the external server and controls the display to display the purchase information about the imaging device together with the virtual image of the imaging device.

8. A method of controlling a mobile device, the method comprising:

photographing a space using a camera, the space including a space where an imaging device, which is an electronic device capable of displaying an image, is to be simulated to be installed;
displaying an image of the space photographed by the camera together with a grid on a display;
in response to a user input, displaying a virtual image of the imaging device on the grid, a size of the virtual image of the imaging device being adjusted;
in response to the user input of selecting the virtual image of the imaging device, displaying a plurality of virtual content images around the virtual image of the imaging device,
in response to the user input of selecting any one virtual content image of the plurality of virtual content images, displaying first content corresponding to the selected virtual content image in an area of the virtual image of the imaging device, and
in response to the user input of additionally selecting the virtual content image, dividing the area of the virtual image of the imaging device into a first area and a second area and displaying the first content and second content corresponding to the additionally selected virtual content image in the first area and the second area, respectively.

9. The method of claim 8, wherein the displaying of the virtual image of the imaging device on the grid includes, in response to the user input of selecting at least one cell included in the grid, displaying the virtual image of the imaging device on the selected at least one cell.

10. The method of claim 8, wherein the displaying of the image of the photographed space together with the grid on the display includes recognizing at least one of a specific pattern and a specific object from the image of the space to recognize a plane on which the imaging device is installable and displaying the grid on the recognized plane.

11. The method of claim 10, wherein the displaying of the image of the photographed space together with the grid on the display further includes:
displaying the image of the space and a guide line together on the display; and
recognizing the plane based on the guide line and displaying the grid on the recognized plane.

12. The method of claim 8, wherein the displaying of the image of the photographed space together with the grid on the display further includes, in response to the user input of changing a size of a cell of the grid, displaying the grid having the cell with the changed size together with the image of the space.

\* \* \* \* \*